(12) United States Patent
Chuang et al.

(10) Patent No.: US 11,863,757 B2
(45) Date of Patent: *Jan. 2, 2024

(54) METHODS AND APPARATUS FOR GENERATING AFFINE CANDIDATES

(71) Applicant: HFI Innovation Inc., Zhubei (TW)

(72) Inventors: Tzu-Der Chuang, Zhubei (TW); Ching-Yeh Chen, Taipei (TW); Zhi-Yi Lin, Hsin-Chu (TW)

(73) Assignee: HFI Innovation Inc., Zhubei (TW)

( * ) Notice: Subject to any disclaimer, the term of this patent is extended or adjusted under 35 U.S.C. 154(b) by 268 days.

This patent is subject to a terminal disclaimer.

(21) Appl. No.: 17/464,498

(22) Filed: Sep. 1, 2021

(65) Prior Publication Data

US 2022/0060717 A1 Feb. 24, 2022

Related U.S. Application Data

(63) Continuation of application No. 16/536,018, filed on Aug. 8, 2019, now Pat. No. 11,140,398.

(Continued)

(51) Int. Cl.
*H04N 19/149* (2014.01)
*H04N 19/176* (2014.01)
(Continued)

(52) U.S. Cl.
CPC ......... *H04N 19/149* (2014.11); *H04N 19/105* (2014.11); *H04N 19/176* (2014.11); *H04N 19/196* (2014.11)

(58) Field of Classification Search
None
See application file for complete search history.

(56) References Cited

U.S. PATENT DOCUMENTS 11,140,398 B2    10/2021    Lin et al.
2017/0214932 A1    7/2017    Huang
(Continued)

FOREIGN PATENT DOCUMENTS

WO    WO 2016/008408 A1    1/2016
WO    WO 2017/118411 A1    7/2017
(Continued)

OTHER PUBLICATIONS

Extended European Search Report for European Application No. EP 19851748.4 dated May 4, 2022.
(Continued)

*Primary Examiner* — Rebecca A Volentine
(74) *Attorney, Agent, or Firm* — Wolf, Greenfield & Sacks, P.C.

(57) ABSTRACT

The techniques described herein relate to methods, apparatus, and computer readable media configured to encode or decode video data. A current block of video data is coded using affine prediction. A first set of candidates of a candidate list for the current block is generated, including determining one or more inherited candidates and deriving one or more constructed candidates. After generating the first set of candidates, it is determined whether the candidate list is full. Upon determining the candidate list is not full, the candidate list is filled by generating a second set of candidates of the candidate list, including one or more of generating one or more zero motion vector candidates, generating one or more additional derived candidates based on the plurality of associated neighboring blocks of the current block, and generating a temporal motion vector candidate based on a temporal collocated picture.

18 Claims, 19 Drawing Sheets

Related U.S. Application Data

(60) Provisional application No. 62/735,102, filed on Sep. 22, 2018, provisional application No. 62/733,103, filed on Sep. 19, 2018, provisional application No. 62/732,017, filed on Sep. 17, 2018, provisional application No. 62/731,641, filed on Sep. 14, 2018, provisional application No. 62/719,826, filed on Aug. 20, 2018.

(51) Int. Cl.
  H04N 19/105 (2014.01)
  H04N 19/196 (2014.01)

(56) References Cited

U.S. PATENT DOCUMENTS

| | | | |
|---|---|---|---|
| 2018/0098063 A1* | 4/2018 | Chen | ............ H04N 19/176 |
| 2019/0273943 A1 | 9/2019 | Zhao et al. | |
| 2019/0335170 A1 | 10/2019 | Lee et al. | |
| 2019/0342547 A1 | 11/2019 | Lee et al. | |
| 2020/0059651 A1 | 2/2020 | Lin et al. | |

FOREIGN PATENT DOCUMENTS

| | | |
|---|---|---|
| WO | WO 2017/157259 A1 | 9/2017 |
| WO | WO 2018/067823 A1 | 4/2018 |
| WO | WO 2018/126163 A1 | 7/2018 |

OTHER PUBLICATIONS

Bordes et al., Description of the SDR, HDR, and 360 video coding technology proposal by Qualcomm and Technicolor-medium complexity version. JVET-J0022, San Diego, CA. Apr. 2018. 83 pages.

Chen et al., Description of SDR HDR and 360 video coding technology proposal by Qualcomm and Technicolor-low and high complexity versions. JVET document, JVET-J0021. Apr. 10, 2018. 43 pages.

International Search Report and Written Opinion for International Application No. PCT/CN2019/101519 dated Nov. 13, 2019.

Kudo et al., Motion vector prediction methods considering prediction continuity in HEVC. IEEE 2016 Picture Coding Symposium (PCS) Dec. 4, 2016:1-5.

Lin et al., Affine transform prediction for next generation video coding, ITU—Telecommunications Standardization Sector, Study Group 16, Question Q6/16, Contribution 1016, ITU-T13-SG16-C-1016, Sep. 2015, Geneva, CH, 11 pages.

Yang et al., Description of CE4: Inter prediction and motion vector coding. Joint Video Experts Team (JVET) of ITU-T SG 16 WP 3 and ISO/IEC JTC 1/SC 29/WG11. JVET-J1024r1. Apr. 10-20, 2018:46 pages.

U.S. Appl. No. 16/536,018, filed Aug. 8, 2019, Lin et al.

PCT/CN2019/101519, Nov. 13, 2019, International Search Report and Written Opinion.

EP19851748.4, May 4, 2022, Extended European Search Report.

* cited by examiner

METHODS AND APPARATUS FOR GENERATING AFFINE CANDIDATES

RELATED APPLICATIONS

This application is a Continuation of U.S. application Ser. No. 16/536,018, filed Aug. 8, 2019, entitled "METHODS AND APPARATUS FOR GENERATING AFFINE CANDIDATES," which is claims priority under 35 U.S.C. § 119(e) to U.S. Provisional Application Ser. No. 62/719,826, filed on Aug. 20, 2018, entitled "METHODS OF AFFINE PREDICTION," U.S. Provisional Application Ser. No. 62/731,641, filed on Sep. 14, 2018, entitled "AFFINE MV BUFFER REDUCTION AND CORNER MV DERIVATION," U.S. Provisional Application Ser. No. 62/732,017, filed on Sep. 17, 2018, entitled "AFFINE CANDIDATE DERIVATION," U.S. Provisional Application Ser. No. 62/733,103, filed on Sep. 19, 2018, entitled "AFFINE CANDIDATE DERIVATION AND AFFINE MV BUFFER CONSTRAINT," and U.S. Provisional Application Ser. No. 62/735,102, filed on Sep. 22, 2018, entitled "AFFINE MV BUFFER CONSTRAINT," which are herein incorporated by reference in their entirety.

TECHNICAL FIELD

The techniques described herein relate generally to video coding, and particularly to generating affine motion vector candidates for a candidate list, such as to pad the candidate list.

BACKGROUND OF INVENTION

Various video coding techniques can be used to encode video, such as for storage and/or transmission. The video coding techniques can also provide for decoding the encoded video for playback. A video codec can include an electronic circuit and/or software that compresses and/or decompresses digital video. Various video coding standards exist, and video codecs typically comply with one or more video coding standards. For example, High-Efficiency Video Coding (HEVC), is an international video coding standard developed by the Joint Collaborative Team on Video Coding (JCT-VC). As another example, the Versatile Video Coding (VVC) Video Coding Standard is another international video coding standard under development by the Joint Video Experts Team (JVET). Many video coding standards, including HEVC and VVC, use spatial and temporal compression. The compression process can encode video data by generating residual data that can be transformed, quantized, and entropy coded to generate the resulting bit stream, and likewise decoded by entropy decoding the bit stream, inverse quantizing and inverse transforming the data to reconstruct the residual data, and ultimately the picture.

SUMMARY OF INVENTION

In accordance with the disclosed subject matter, apparatus, systems, and methods are provided for generating motion vector candidates for an affine motion vector candidate list. The techniques can include generating the candidates according to one or more techniques. In some embodiments, the techniques can be used to pad the affine motion vector candidate list, including generating one or more candidates for the candidate list after adding inherited affine candidates and constructed affine candidates. In some embodiments, the techniques can include generating one or more of zero motion vector candidates, derived affine candidates, and/or temporal candidates.

Some embodiments relate to a method for encoding or decoding video data. The method includes determining a current block of video data is coded using affine prediction and generating a first set of candidates of a candidate list for the current block, including determining one or more inherited candidates that each inherit an affine model of an associated neighboring block, and deriving one or more constructed candidates that are each based on a plurality of associated neighboring blocks of the current block. The method includes determining, after generating the first set of candidates, whether the candidate list is full. Upon determining the candidate list is not full, filling the candidate list by generating a second set of candidates of the candidate list, comprising one or more of generating one or more zero motion vector candidates, generating one or more additional derived candidates based on the plurality of associated neighboring blocks of the current block, and generating a temporal motion vector candidate based on a temporal collocated picture.

In some examples, if the affine prediction is associated with a four parameter affine mode, each candidate in the candidate list comprises a first motion vector for a first control point and a second motion vector for a second control point, and if the affine prediction is associated with a six parameter affine mode, each candidate in the candidate list comprises the first and second motion vectors and a third motion vector for a third control point.

In some examples, generating the second set of candidates of the candidate list includes generating the one or more additional derived candidates based on the plurality of associated neighboring blocks of the current block, and adding the generated one or more additional derived candidates into the candidate list, upon determining the candidate list is not full, generating the temporal motion vector candidate based on the temporal collocated picture, and adding the generated temporal motion vector candidate into the candidate list, and upon determining the candidate list is not full, generating a remaining number of zero motion vector candidates needed to fill the candidate list.

In some examples, generating the one or more additional derived candidates that are based on the plurality of associated neighboring blocks of the current block includes determining an available motion vector based on a first set of neighboring blocks, and generating a first candidate comprising the first available motion vector for each control point of the first candidate.

In some examples, the method includes determining the candidate list is not full, determining a second available motion vector based on a second set of neighboring blocks that is different than the first set of neighboring blocks, and generating a second candidate comprising the second available motion vector for each control point of the second candidate.

In some examples, the first set of neighboring blocks neighbor a first sub-block of the current block associated with an upper-left control point, and the second set of neighboring blocks neighbor a second sub-block of the current block associated with an upper-right control point, or the first set of neighboring blocks neighbor the first sub-block, and the second set of neighboring blocks neighbor a third sub-block of the current block associated with a lower-left control point, or the first set of neighboring blocks neighbor the third sub-block, and the second set of neighboring blocks neighbor the second sub-block, or the first set of neighboring blocks neighbor the third sub-block, and the second set of neighboring blocks neighbor the first sub-block, or the first set of neighboring blocks neighbor the second sub-block, and the second set of neighboring blocks neighbor the first sub-block, or the first set of neighboring blocks neighbor the second sub-block, and the second set of neighboring blocks neighbor the third sub-block.

In some examples, the method includes determining the candidate list is not full, determining a third available motion vector based on a third set of neighboring blocks that is different than the first and second sets of neighboring blocks, and generating a third candidate comprising the second available motion vector for each control point of the second candidate.

In some examples, the first set of neighboring blocks neighbor a first sub-block of the current block associated with an upper-left control point, the second set of neighboring blocks neighbor a second sub-block of the current block associated with an upper-right control point, and the third set of neighboring blocks neighbor a third sub-block of the current block associated with a lower-left control point, or the first set of neighboring blocks neighbor the first sub-block, the second set of neighboring blocks neighbor the third sub-block, and the third set of neighboring blocks neighbor the second sub-block, or the first set of neighboring blocks neighbor the third sub-block, the second set of neighboring blocks neighbor the second sub-block, and the third set of neighboring blocks neighbor the first sub-block, or the first set of neighboring blocks neighbor the third sub-block, the second set of neighboring blocks neighbor the first sub-block, and the third set of neighboring blocks neighbor the second sub-block, or the first set of neighboring blocks neighbor the second sub-block, the second set of neighboring blocks neighbor the first sub-block, and the third set of neighboring blocks neighbor the third sub-block, or the first set of neighboring blocks neighbor the second sub-block, the second set of neighboring blocks neighbor the third sub-block, and the third set of neighboring blocks neighbor the first sub-block.

In some examples, generating the temporal motion vector candidate includes determining a motion vector is available from a block of the temporal collocated picture that is adjacent to a bottom-right sub-block of a temporal collocated block to the current block in the temporal collocated picture, and generating the temporal motion vector candidate comprising the motion vector for each control point of the temporal motion vector candidate.

In some examples, the method includes determining a motion vector is not available from a block of the temporal collocated picture that is adjacent to a bottom-right sub-block of a temporal collocated block to the current block in the temporal collocated picture, and generating the temporal motion vector candidate comprising a motion vector from a center bottom-right sub-block of the temporal collocated block for each control point of the temporal motion vector candidate.

In some examples, generating the temporal motion vector candidate includes determining a motion vector for the temporal motion vector candidate based on the temporal collocated picture, and scaling the motion vector prior to generating the temporal motion vector candidate.

In some examples, generating the one or more zero motion vector candidates includes determining a number of reference pictures associated with the candidate list, and generating the number of zero motion vector candidates, wherein each of the generated zero motion vector candidates comprises a unique reference index selected from a set of whole numbers ranging from zero to the number minus one.

In some examples, the method includes determining the candidate list is not full, and generating a remaining number of zero motion vector candidates needed to fill the candidate list, wherein each of the remaining number of zero motion vector candidates has a reference index of zero.

In some examples, generating the second set of candidates of the candidate list comprises using a same motion vector for each control point.

Some embodiments relate to an apparatus configured to encode or decode video data. The apparatus includes a processor in communication with memory, the processor being configured to execute instructions stored in the memory that cause the processor to determine a current block of video data is coded using affine prediction, and generate a first set of candidates of a candidate list for the current block, including determining one or more inherited candidates that each inherit an affine model of an associated neighboring block, and deriving one or more constructed candidates that are each based on a plurality of associated neighboring blocks of the current block. The instructions are configured to cause the processor to determine, after generating the first set of candidates, whether the candidate list is full, and upon determining the candidate list is not full, filling the candidate list by generating a second set of candidates of the candidate list, including one or more of generating one or more zero motion vector candidates, generating one or more additional derived candidates based on the plurality of associated neighboring blocks of the current block, and generating a temporal motion vector candidate based on a temporal collocated picture.

In some examples, generating the second set of candidates of the candidate list includes generating the one or more additional derived candidates based on the plurality of associated neighboring blocks of the current block, and adding the generated one or more additional derived candidates into the candidate list, upon determining the candidate list is not full, generating the temporal motion vector candidate based on the temporal collocated picture, and adding the generated temporal motion vector candidate into the candidate list, and upon determining the candidate list is not full, generating a remaining number of zero motion vector candidates needed to fill the candidate list.

In some examples, generating the one or more additional derived candidates that are based on the plurality of associated neighboring blocks of the current block includes determining an available motion vector based on a first set of neighboring blocks, and generating a first candidate comprising the first available motion vector for each control point of the first candidate.

In some examples, generating the temporal motion vector candidate includes determining a motion vector is available from a block of the temporal collocated picture that is adjacent to a bottom-right sub-block of a temporal collocated block to the current block in the temporal collocated picture, and generating the temporal motion vector candidate comprising the motion vector for each control point of the temporal motion vector candidate.

In some examples, determining a motion vector is not available from a block of the temporal collocated picture that is adjacent to a bottom-right sub-block of a temporal collocated block to the current block in the temporal collocated picture, and generating the temporal motion vector candidate comprising a motion vector from a center bottom-right sub-block of the temporal collocated block for each control point of the temporal motion vector candidate.

Some embodiments relate to at least one non-transitory computer-readable storage medium storing processor-executable instructions that, when executed by at least one computer hardware processor, cause the at least one computer hardware processor to perform the acts of determining a current block of video data is coded using affine prediction, and generating a first set of candidates of a candidate list for the current block, including determining one or more inherited candidates that each inherit an affine model of an associated neighboring block, and deriving one or more constructed candidates that are each based on a plurality of associated neighboring blocks of the current block. The instructions are configured to cause the at least one computer hardware processor to determine, after generating the first set of candidates, whether the candidate list is full, and upon determining the candidate list is not full, filling the candidate list by generating a second set of candidates of the candidate list, comprising one or more of generating one or more zero motion vector candidates, generating one or more additional derived candidates based on the plurality of associated neighboring blocks of the current block, and generating a temporal motion vector candidate based on a temporal collocated picture.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 17 is a diagram showing control points at the center position of four corner sub-blocks, according to some embodiments.

FIG. 18A-B are diagrams showing MV positions, according to some embodiments.

DETAILED DESCRIPTION OF INVENTION

Figure 1:
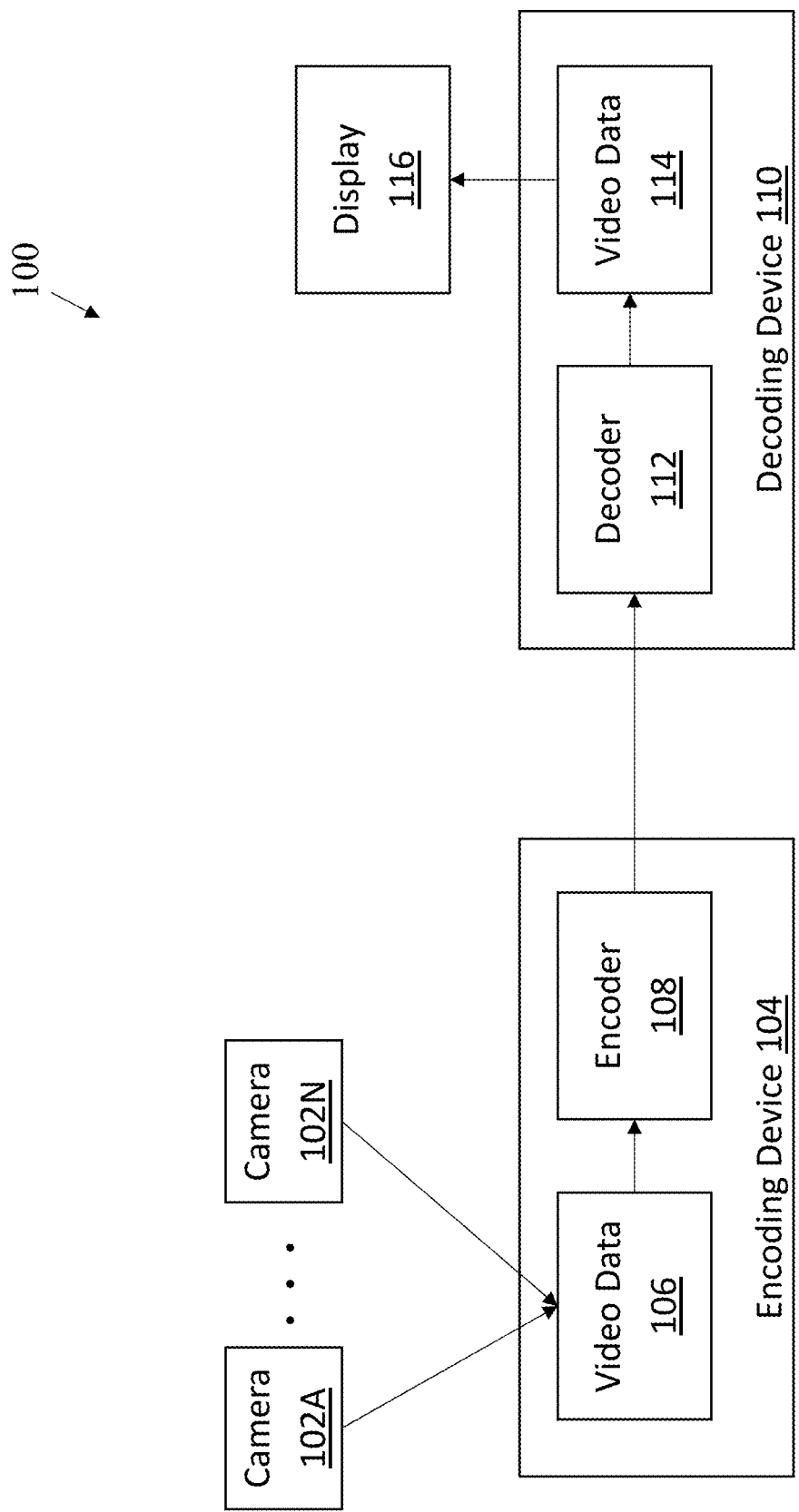
FIG. 1 shows an exemplary video coding configuration, according to some embodiments.

Techniques can be used to generate candidate lists for various prediction techniques, such as for affine prediction, such as for affine merge mode and/or affine inter mode. For example, candidates for affine prediction can include inherited affine candidate(s), which inherit the affine model of a neighboring block (e.g., such that the control point motion vectors are from the same neighboring block), and/or constructed candidates, for which the control point motion vectors are from different neighboring blocks. The inventors have discovered and appreciated that existing candidate list generation techniques may not completely fill the candidate list. When the candidate list is not full, it may cause problems with encoding and/or decoding. For example, if the candidate list is not full, an encoder or decoder may choose a non-existing candidate.

Accordingly, the inventors have developed techniques for generating candidates for the candidate list. The techniques can be used, for example, if the candidate list is not full after adding any inherited candidates and/or constructed candidates. In some embodiments, the techniques can include filling the list by generating one or more zero motion vector candidates. In some embodiments, the techniques can include generating additional derived candidates, where each candidate includes the same motion vector for each control point. In some embodiments, the techniques can include generating one or more temporal candidates that use temporal MVs from a temporal picture. In one embodiment, if the candidate list is not full after adding any inherited candidates and/or constructed candidates, the additional derived candidate(s) generated based on the associated neighboring blocks of the current block can be used to fill the candidate list firstly. If the candidate list is still not full after adding the additional derived candidate(s), then the temporal candidate(s) generated based on the temporal collocated block of the current block can be used to fill the candidate list. However, if the candidate list is not full after adding the temporal candidate(s), the remaining entry or entries of the candidate list can be filled by the zero motion vector candidate(s). In another embodiment, if the candidate list is not full after adding any inherited candidates and/or constructed candidates, the temporal candidate(s) generated based on the temporal collocated block of the current block can be used to fill the candidate list firstly. If the candidate list is still not full after adding the temporal candidate(s), then the additional derived candidate(s) generated based on the associated neighboring blocks of the current block can be used to fill the candidate list. However, if the candidate list is not full after adding the additional derived candidate(s), the remaining entry or entries of the candidate list can be filled by the zero motion vector candidate(s).

In some embodiments, a combination of the techniques described herein can be used to fill the candidate list. For example, in some embodiments, after adding any inherited candidates and/or constructed candidates, the techniques can include: (a) adding a candidate with the first available motion vector in a set of neighboring blocks that neighbor the sub-block associated with the lower-left control point, (b) adding a candidate with the first available motion vector in a set of neighboring blocks that neighbor the sub-block associated with the upper-right control point, (c) adding a candidate with the first available motion vector in a set of neighboring blocks that neighbor the sub-block associated with the upper-left control point, (d) adding a candidate with a temporal MV from a collocated block or picture, and (e) adding one or more zero motion vector candidates.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. The video coding configuration 100 includes one or more cameras 102A-102N, collectively referred to as cameras 102, that generate video data 106. The cameras 102 can be any type of camera, such as cameras that include audio recording capabilities, and/or separate cameras and audio recording functionality. The encoding device 104 includes an encoder 108. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video to generate video data 114. The display 116 displays the video data 114.

Figure 2:
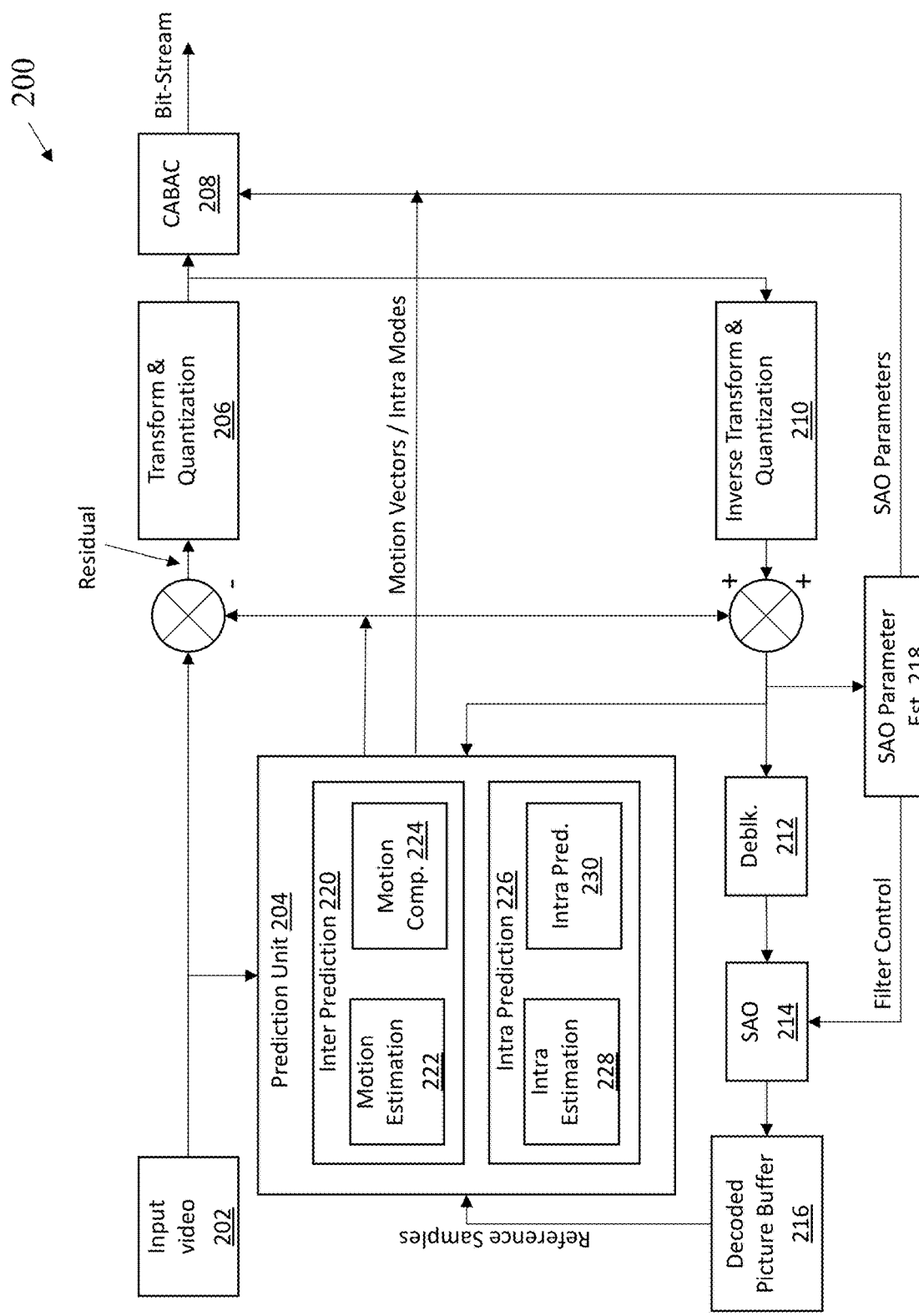
FIG. 2 shows aspects of an exemplary video encoder, according to some embodiments.

FIG. 2 shows aspects of an exemplary video encoder 200, according to some embodiments. The video encoder 200 receives the input video 202 and includes at least part of a prediction unit 204, a transform & quantization unit 206, a CABAC unit 208, an inverse Transform & quantization unit 210, a deblocking unit 212, SAO unit 214, a decoded picture buffer 216, and a SAO parameter estimation unit 218. The prediction unit 204 includes inter-prediction processing 220, which includes motion estimation unit 222 and motion compensation unit 224, and intra-prediction processing 226, which includes intra estimation unit 228 and intra prediction unit 230. In other embodiments, the video encoder 200 may include more, fewer, and/or different components than those illustrated in FIG. 2.

For block-based motion compensation, a basic unit for compression is the CU, which can be a 2N×2N square block. Each CU can be recursively split into four smaller CUs until the predefined minimum size is reached. Each CU may contain one or multiple PUs. If one CU contains only one PU, PU can be viewed same as CU. The video encoder 200 may encode CUs. As part of the encoding process for a CU, the prediction unit 204 may partition the CUs into one or more PUs.

The prediction unit 204 can perform inter prediction using inter prediction unit 220. The inter prediction processing can include generating predictive data for a PU by performing inter prediction on each PU of a CU. Depending on the type of inter prediction, the motion estimation unit 222 may search reference samples from the decoded picture buffer 216, including reference samples from either the List0 or List1. The motion estimation unit 222 can generate reference picture indexes for the positions in List0 and/or List1, and can generate motion vectors to indicate displacements between the reference location and a sample block of the PU. The motion compensation unit 224 can generate the predictive sample blocks of the PU based at least in part on actual or interpolated samples at the reference region indicated by the motion vector of the PU.

The prediction unit 204 can perform intra prediction using intra prediction unit 226. The intra prediction processing can include generating predictive data for a PU by performing intra prediction on the PU. The predictive data for the PU may include predictive blocks for the PU and various syntax elements. The prediction unit 204 may select the predictive data for PUs from among the predictive data generated by inter prediction processing or the predictive data generated by intra prediction processing. In some embodiments, the prediction unit 204 includes a multi-hypothesis (MH) mode, as discussed further herein. In some embodiments, MH mode can be an independent mode from inter or intra prediction. In some embodiments, MH mode can may be part of inter and/or intra prediction. For example, MH mode (viewed as an inter mode) can add one additional hypothesis of prediction on top of one existing hypothesis of prediction derived from inter prediction mode. For another example, MH mode (viewed as intra mode) can add one additional hypothesis of prediction on top of one existing hypothesis of prediction derived from intra prediction mode.

The transform & quantization unit 206 can generate transform coefficients for each TU by applying a transform mode (e.g., DCT, DST or any other type of transform), and can quantize the transform coefficients. The CABAC unit 208 entropy codes the quantized transform coefficients by performing a Context-Adaptive Binary Arithmetic Coding (CABAC) on the quantized transform coefficients and/or any other side information for generating the bit-stream. In some other embodiments, the CABAC unit 208 can be replace with other entropy coding unit to generate the entropy-coded data. The encoder 200 can output the entropy-coded transform coefficients in a bit stream.

The inverse transform & quantization unit 210 can apply inverse quantization and inverse transform mode transforms (e.g., inverse DCT, DST or any other type of inverse transform) to reconstruct a residual block from the coefficient block. The deblocking unit 212 can perform one or more deblocking operations on the reconstructed blocks. The SAO unit 214 and SAO parameter estimation unit 218 implement sample adaptive offset (SAO), which is an in-loop filtering technique. The SAO process can include classifying reconstructed samples into different categories, obtaining an offset for each category, and then adding the offset to each sample of the category. The offset of each category can be signaled to the decoder to reduce sample distortion.

The decoded picture buffer 216 can store the reconstructed, SAO processed, blocks. As described herein, the prediction unit 204 can use the reconstructed blocks to perform inter prediction and/or intra prediction.

Figure 3:
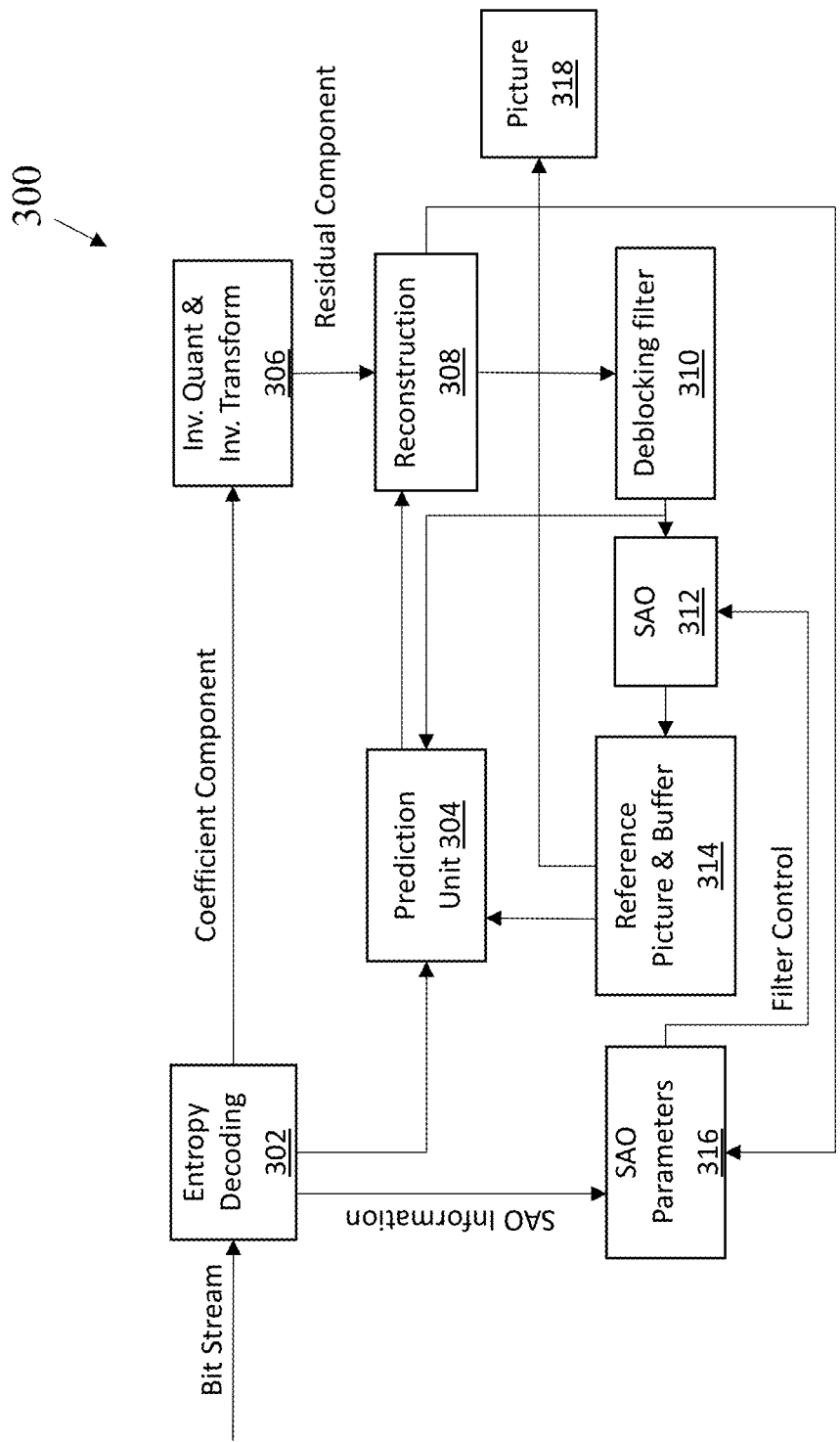
FIG. 3 shows aspects of an exemplary video decoder, according to some embodiments.

FIG. 3 shows aspects of an exemplary decoder 300, according to some embodiments. The decoder 300 includes at least some of an entropy decoding unit 302, a prediction unit 304, an inverse quantization and inverse transform unit 306, a reconstruction unit 308, a deblocking filter 310, a SAO unit 312, a reference picture and buffer 314, and a SAO parameter unit 316. For exemplary purposes, FIG. 3 is discussed in conjunction with HEVC, although it should be appreciated that the techniques can be applied to other video coding standards. In other embodiments, the video decoder 300 may include more, fewer, and/or different components than those illustrated in FIG. 3.

The entropy decoding unit 302 parses the bit stream to decode the syntax elements. The prediction unit 304 can construct one or more reference picture lists, such as List0 and/or List1, e.g., using syntax elements signaled in the bit stream. The prediction unit 304 can perform motion compensation and/or intra prediction. For example, if a PU is encoded using inter prediction, the prediction unit 304 may extract motion information for the PU, which can be used to determine one or more reference regions for the PU. The prediction unit 304 can generate, based on samples blocks at the one or more reference blocks, predictive blocks for the PU. As another example, if a PU is encoded using intra prediction, the prediction unit 304 can perform intra prediction to generate predictive blocks for the PU based on neighboring PUs. In some embodiments, the prediction unit 304 includes a multiple-hypothesis (MH) mode processing, as discussed further herein. In some embodiments, the MH mode processing can be an independent from inter or intra prediction processing. In some embodiments, the MH mode processing can be part of inter and/or intra prediction. For example, MH mode (viewed as an inter mode) can add one additional hypothesis of prediction on top of one existing hypothesis of prediction derived from inter prediction mode. For another example, MH mode (viewed as intra mode) can add one additional hypothesis of prediction on top of one existing hypothesis of prediction derived from intra prediction mode.

The inverse quantization and inverse transform unit 306 may inverse quantize a coefficient block and may apply an inverse transform to generate a residual block. The reconstruction unit 308 may reconstruct the coding blocks.

Reconstruction unit 308 may use the transform block (e.g., luma, Cb and Cr transform blocks) associated with TUs of a CU and the predictive blocks (e.g., luma, Cb and Cr predictive blocks) of the PUs of the CU, i.e., either intra-prediction data and/or inter-prediction data, as applicable, to reconstruct the coding blocks (e.g., luma, Cb and Cr coding blocks) of the CU. For example, reconstruction unit 308 may add samples (residual component) of the transform blocks, such as luma, Cb and Cr transform blocks, to corresponding samples (predictor component) of the predictive blocks to reconstruct the coding blocks of the CU.

The deblocking filter 310 can perform a deblocking operation to reduce blocking artifacts associated with the coding blocks. The SAO unit 312 and the SAO parameter unit 316 implement the SAO in-loop filter. The offset of each SAO category can be signaled to the decoder 300, which the decoder can use to reduce sample distortion. The reference picture and buffer 314 can store the resulting deblocked, SAO processed coding blocks. The buffer 314 can provide reference pictures for subsequent motion compensation, intra prediction, and presentation of pictures as shown via picture 318.

To achieve the best coding efficiency of hybrid coding architecture in HEVC, there are two kinds of prediction modes for each PU, which the intra prediction and inter prediction modes. For intra prediction modes, the spatial neighboring reconstructed pixels can be used to generate the directional predictions. There can be up to multiple directions (e.g. 33, 65, or more), as discussed further herein. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide the MVP in Inter AMVP mode, the advanced motion vector prediction (AMVP) scheme is used to select a motion vector predictor among an AMVP candidate set including two spatial MVPs and one temporal MVP. So, in AMVP mode, an MVP index for the MVP and the corresponding MVDs are encoded and transmitted. In addition, the inter prediction direction to specify the prediction directions among bi-prediction and uni-prediction, which are List0 (L0) and List1 (L1), accompanied with the reference frame index for each list may also be encoded and transmitted.

When a CU/PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

A four parameter affine prediction has been proposed, which can be used for affine merge mode and/or affine inter mode, such as described by ITU-T13-SG16-C-1016 by Sixin Lin, Huanbang Chen, Hong Zhang, Sychev Maxim, Haitao Yang, and Jiantong Zhou, "Affine transform prediction for next generation video coding", ITU—Telecommunications Standardization Sector, STUDY GROUP 16 Question Q6/16, Contribution 1016, September 2015, Geneva, CH, which is hereby incorporated by reference herein in its entirety.

When an affine motion block is moving, the motion vector field of the block can be described by two control point motion vectors or four parameters, described in Equation 1:

$$\begin{cases} x' = ax + by + e \\ y' = -bx + ay + f \\ vx = x - x' \\ vy = y - y' \end{cases} \overset{\Delta}{\Longrightarrow} \begin{cases} vx = (1-a)x - by - e \\ vy = (1-a)y + bx - f \end{cases} \quad \text{Equation 1}$$

Figure 4:
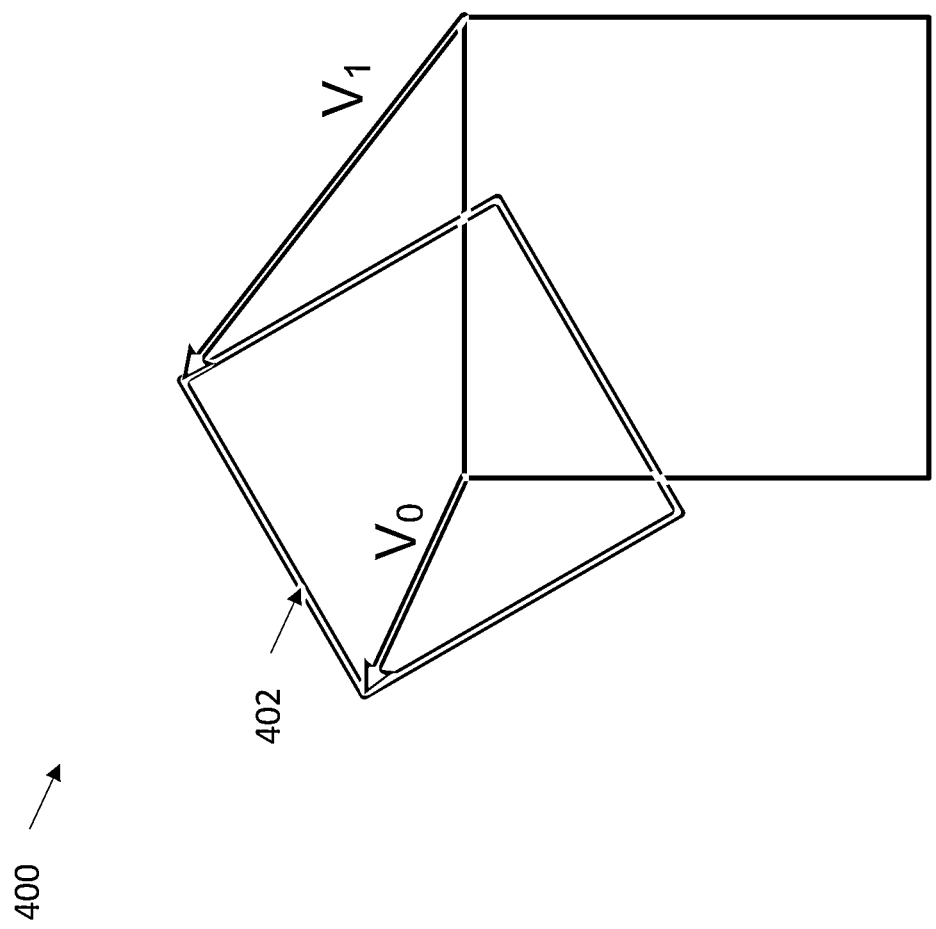
FIG. 4 shows an example of a two control point motion vectors $V_0$ and $V_1$, according to some examples.

FIG. 4 shows an example 400 of a two control point motion vectors $V_0$ and $V_1$, according to some examples. As shown, the transformed block 402 is a rectangular block. The motion vector field of each point in this moving block can be described by Equation 2:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases}$$ Equation 2

Where:

(x, y) represent the particular point in the moving block;

($v_{0x}$, $v_{0y}$) is the control point motion vector $V_0$ on the top-left corner of the block; and ($v_{1x}$, $v_{1y}$) is the control point motion vector $V_1$ on the above-right corner of the block.

Figure 5:
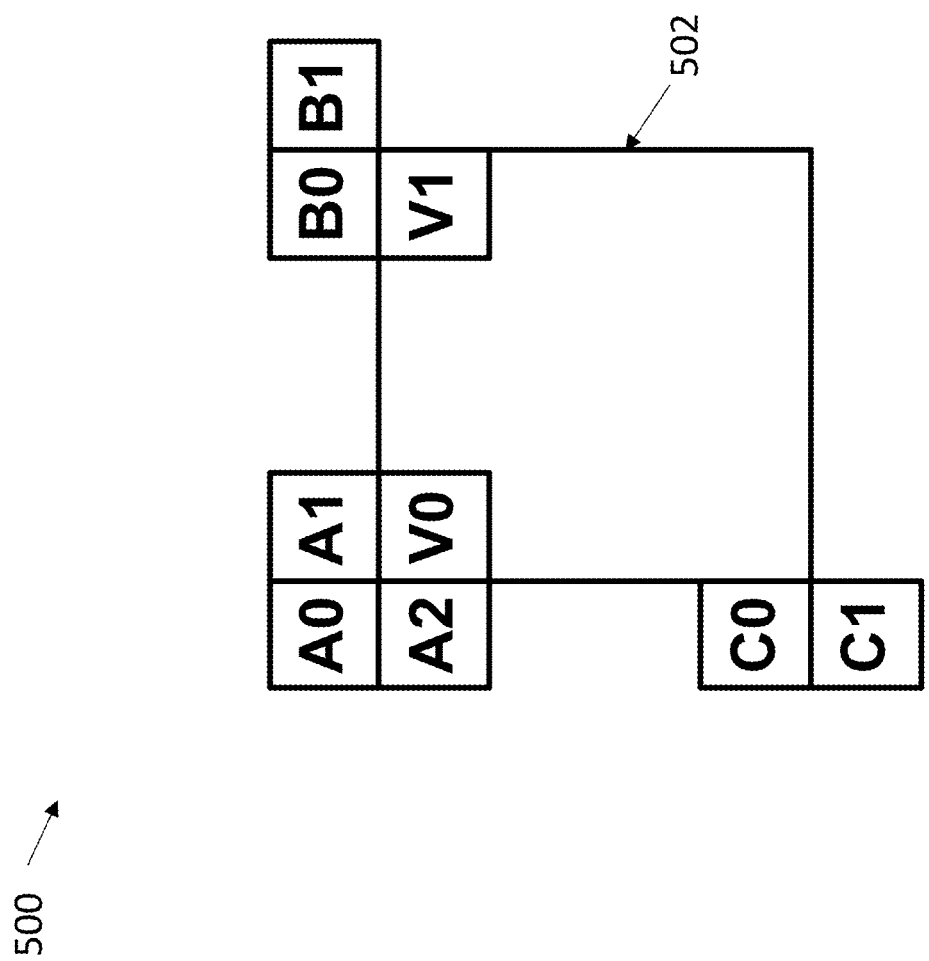
FIG. 5 shows a diagram of an example of neighbor reconstructed blocks that can be used to generate a candidate MVP pair list for affine inter mode, according to some examples.

In some embodiments, affine motion prediction can be used for inter mode. FIG. 5 shows a diagram 500 of an example of neighbor reconstructed blocks that can be used to generate a candidate MVP pair list for affine inter mode, according to some examples. In some embodiments, for an inter mode coded CU, when the CU size is equal to or larger than 16×16, an affine_flag can be signalled to indicate whether the affine inter mode is applied or not. In some embodiments, if the current CU is coded in affine inter mode, a candidate MVP pair list can be built using the neighboring valid reconstructed blocks. As shown in FIG. 5, for example, for a current CU 502 $v_0$ is selected from the motion vectors of the block $A_0$, $A_1$ or $A_2$, and $v_1$ is selected from the motion vectors of the block $B_0$ and $B_1$. The index of candidate MVP pair can be signaled in the bit stream. The MV difference (MVD) of the two control points can be coded in the bit stream.

In some embodiments, affine motion prediction can be used for merge mode. If the current CU is a merge PU, the neighboring five blocks ($C_0$, $B_0$, $B_1$, $C_1$, and $A_0$ blocks in FIG. 5) are checked to determine whether one of the neighboring blocks is affine inter mode or affine merge mode. If yes, an affine_flag can be signaled to indicate whether the current PU is predicted using affine mode. When the current PU is applied in affine merge mode, it gets the first block coded with affine mode from the valid neighbor reconstructed blocks. The selection order for the candidate block can be from left, above, above-right, left-bottom to above-left (e.g., $C_0 \rightarrow B_0 \rightarrow B_1 \rightarrow C_1 \rightarrow A_0$) as shown in FIG. 5. The affine parameter of the first affine coded block can be used to derive the $v_0$ and $v_1$ for the current PU.

In video standards such as HEVC, the decoded MVs of each PU can be downsampled (e.g., with a 16:1 ratio) and stored in the temporal MV buffer for the MVP derivation for the following frames. For a 16×16 block, only the top-left 4×4 MV is stored in the temporal MV buffer and the stored MV represents the MV of the whole 16×16 block.

Affine MVP Pruning

In affine inter and/or affine merge mode, if any MVP list is to be constructed, affine MVP can be pruned by existing MVPs in the list. In affine inter and affine merge using separate list, the to-be-added affine MVP can be pruned with other affine MVPs in the list. However, for affine merge using a unified list, the to-be-added affine MVP can be not only pruned with existing affine MVPs in the list, but also other non-affine MVPs in the list.

When one affine MVP is pruned with affine MVPs only, different pruning schemes can be applied. Also, the affine MVP pruning techniques described herein can be applied to separate affine candidate list construction, e.g. affine AMVP MVP candidate list and/or affine merge candidate list.

In some embodiments, the pruning can be done by full pruning. For example, each to-be-added affine MVP can be pruned by all of the existing affine MVPs.

In some embodiments, the affine MVPs in group B, group C, and group A in FIG. 5 can be firstly pruned in their group, and then the survived candidates in two of the three groups will be pruned by the survived MVP from the third group. For example, affine MVP from C1 will be pruned by the affine MVP from C0, and the affine MVP from B1 will be pruned by the affine MVP from B0. Then, MVP from group B will be pruned by MVP from A0, and MVP from group C will be pruned by MVP from A0. In some embodiments, in group A, only position A0 can be searched.

In some embodiments, the to-be-added affine MVP will only be pruned by a certain MVP in the list. For example, the to-be-added affine MVP will only be pruned by the first affine MVP in the MVP list, the second affine MVP in the MVP list, or the last affine MVP in the MVP list.

In some embodiments, the affine MVPs in on group will only be pruned by the MVPs from one of the other two groups. For example, the MVPs from group C will be pruned by the MVP from group B. And the MVPs from group B will be pruned by the MVPs from group A.

In some embodiments, affine MVPs will only be pruned by other MVPs in its own group. For example, the affine MVP from group B will only be pruned by other MVPs from group B, the affine MVP from group C will only be pruned by other MVPs from group C, and the affine MVP from group A will only be pruned by other MVPs from group A.

In some embodiments, the affine MVP of C0 is first put into the list. Then, the affine MVP of B0 is added after. The B0 is compared with C0. Then the affine MVP of B1 is added. The B1 is compared with B0. Then the affine MVP of C1 is added. The C1 is compared with the C0. Then the affine MVP of A0 is added. The A0 is compared with C0 and B0.

The pruning can be done by comparing the similarity of the control points' MVs. In some embodiments, if the MV difference is smaller than a threshold, the to-be-added affine MVP will be pruned. In some embodiments, the to-be-added affine MVP can only be pruned if the MVs of the control points in the two MVPs are the same.

When one affine MVP is pruned by affine MVPs and other non-affine MVPs in the unified merge list, different pruning schemes can be applied.

In some embodiments (e.g., in addition to the pruning techniques described above), affine MVPs generated by neighboring blocks can also be pruned by other non-affine MVPs. In some embodiments, if the to-be-added affine MVP's control points' MVs are same as or similar to one of the existing non-affine MVP, or the difference between the two control points' MVs of the affine MVP for 4-parameter affine model, or three control points of the affine MVP for 6-parameter affine model, is smaller than a threshold, the to-be-added affine MVP will be pruned.

In some embodiments, if one of the existing non-affine MVP is from ATMVP mode, and the reference MVs come from affine blocks, the to-be-added affine MVP will be pruned according to the similarity between the control points of the to-be-added affine MVP and the top-left, top-right, and bottom left MVs using ATMVP mode.

Affine MV Derivation

For an affine model with four parameters, the MV for each sub-block can be derived using Equation 3:

$$\begin{cases} v_x = \dfrac{v_{1x} - v_{0x}}{w} x - \dfrac{v_{1y} - v_{0y}}{w} y + v_{0x} \\ v_y = \dfrac{v_{1y} - v_{0y}}{w} x + \dfrac{v_{1x} - v_{0x}}{w} y + v_{0y} \end{cases}$$ Equation 3

Where:

w is the distance between the two control points $V_0$ and $V_1$.

Figure 6:
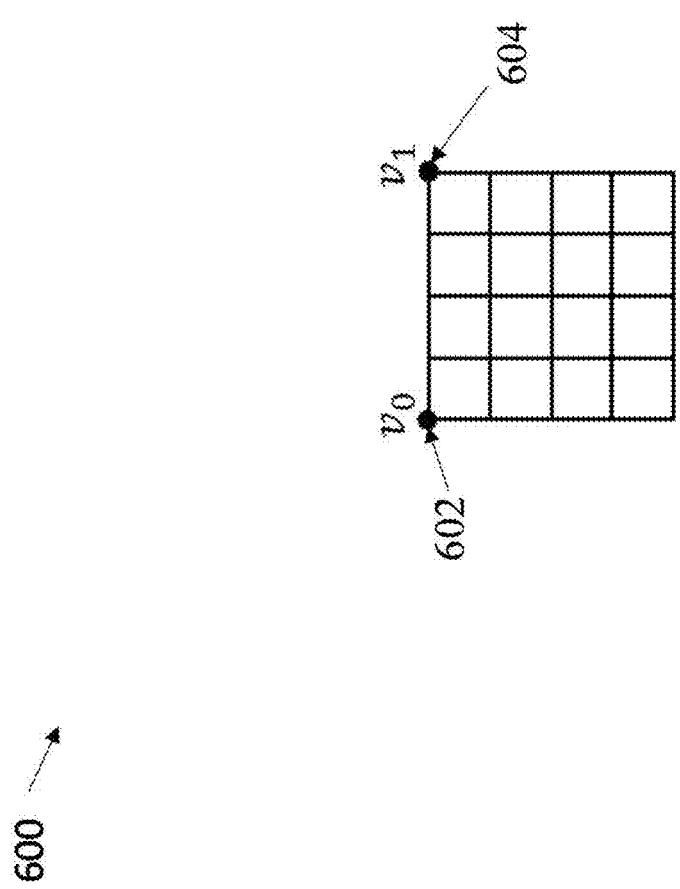
FIG. 6 is a diagram showing exemplary positions of control points $v_0$ and $v_1$, respectively, for an affine block using a 4-parameter affine model, according to some examples.

FIG. 6 is a diagram 600 showing exemplary positions 602, 604 of control points $v_0$ and $v_1$, respectively, for an affine block using a 4-parameter affine model. In the example of FIG. 6, w may be equal to the width of current block since the positions of the two control points 602, 604 are at the upper-left and upper-right corners of the block. In such examples, the division of w in Equation 3 can be simply done by shifting, because the width of blocks can be a power of two.

Figure 7:
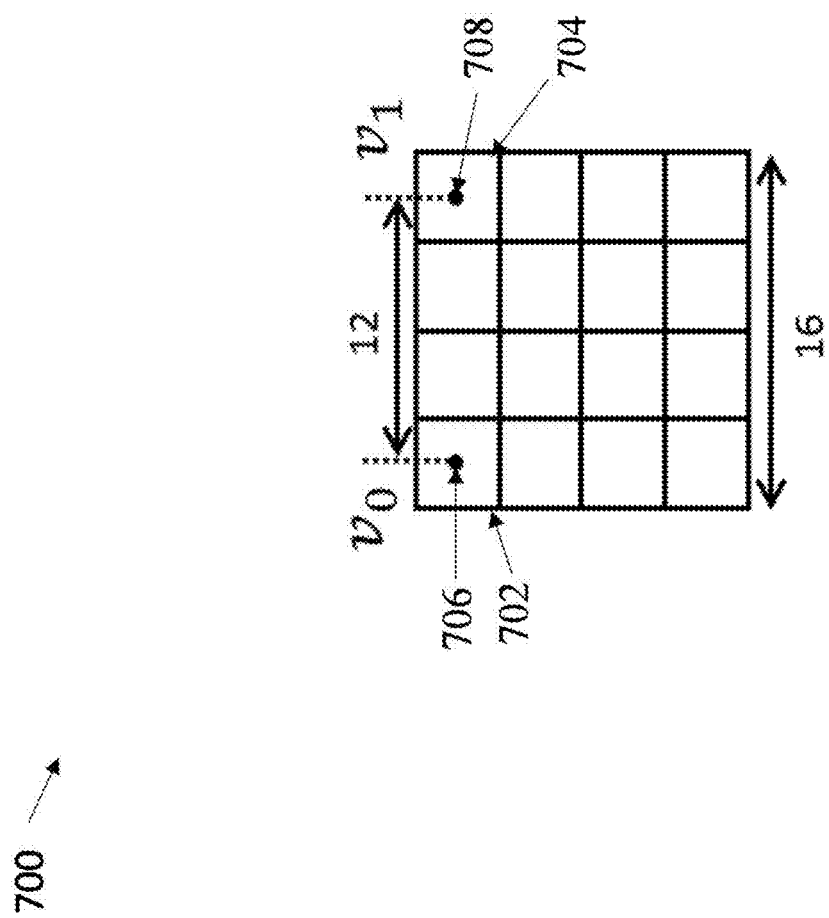
FIG. 7 is a diagram showing an example of storing the MV for the two control points v0 and v1 at the center of the upper-left and upper-right sub-blocks, according to some embodiments.

The inventors have discovered and appreciated that storing the control points' MV may introduce some errors when the MVs of the control points are being referenced. This is because, for example, the control point MV represents the motion at the corner of one sub-block instead of the center of the sub-block. The inventors have developed technical improvements to existing affine models to address such problems. In some embodiments, the techniques include storing the MV in the sub-block's center position (e.g., instead of at the corners as shown in FIG. 6). FIG. 7 is a diagram 700 showing an example of storing the MV for the two control points v0 and v1 at the center of the upper-left and upper-right sub-blocks 702 and 704, as shown by positions 706 and 708, respectively.

The inventors have further discovered and appreciated that in some situations, storing the MVs at the center of the sub-blocks can result in needing to perform complicated division when deriving the sub-blocks' MV in affine blocks. For example, complicated division may be required because the distance between the two control points' MVs may become a number not equal to power of two. For example, in the example shown in FIG. 7, the block is a 16×16 block, and therefore the distance between locations 706 and 708 is 12, which is not a power of two.

Figure 8:
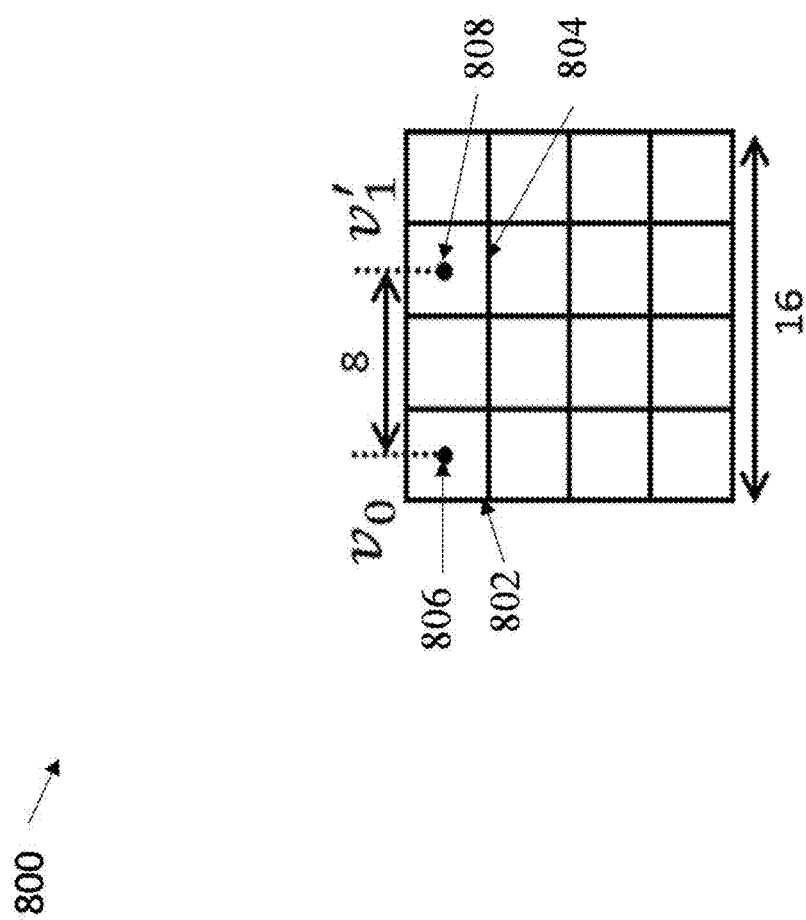
FIG. 8 is a diagram showing an example of changing the position of the control point for 4-parameter affine model, according to some embodiments.

In some embodiments, the position of the control points can be configured such that the distance (e.g., w) between the control points is a power of two. In some embodiments, the position of one or more of the control points can be moved to change the distance between control points to be a power of two. For example, the position of the second control point can be changed so that the distance between the two control points is equal to power of two. FIG. 8 is a diagram 800 showing an example of changing the position of the control point for 4-parameter affine model, according to some embodiments. The diagram 800 uses sub-blocks 802 and 804, which include the control points $v_0$ and $v_1$ at center locations 806 and 808, respectively. In this example, compared to the example 700 shown in FIG. 7, the control point $v_0$ is in the upper-left sub-block 802, while control point $v_1$ is moved to sub-block 804, which is one sub-block to the left of the upper-right sub-block. As shown, the block is a 16×16 block, such that the distance between $v_0$ and $v_1$ is 8 (or $2^3$).

In some embodiments, the sub-block's MV can be determined using the new/modified position of the control point. For example, Equation 4 can be used to derive the sub-block's MV for a changed control point's position for an affine model with four parameters (e.g., as shown in FIG. 8):

$$\begin{cases} v_x = \frac{v'_{1x} - v_{0x}}{W'}x - \frac{v'_{1y} - v_{0y}}{W'}y + v_{0x} \\ v_y = \frac{v'_{1y} - v_{0y}}{W'}x + \frac{v'_{1x} - v_{0x}}{W'}y + v_{0y} \end{cases} \quad \text{Equation 4}$$

where:

$v_1' = (v_{1x}', v_{1y}')$ is the center MV of the new control point; and

W' is the new distance between the two control points, which is constrained to be a power of two.

Figure 9:
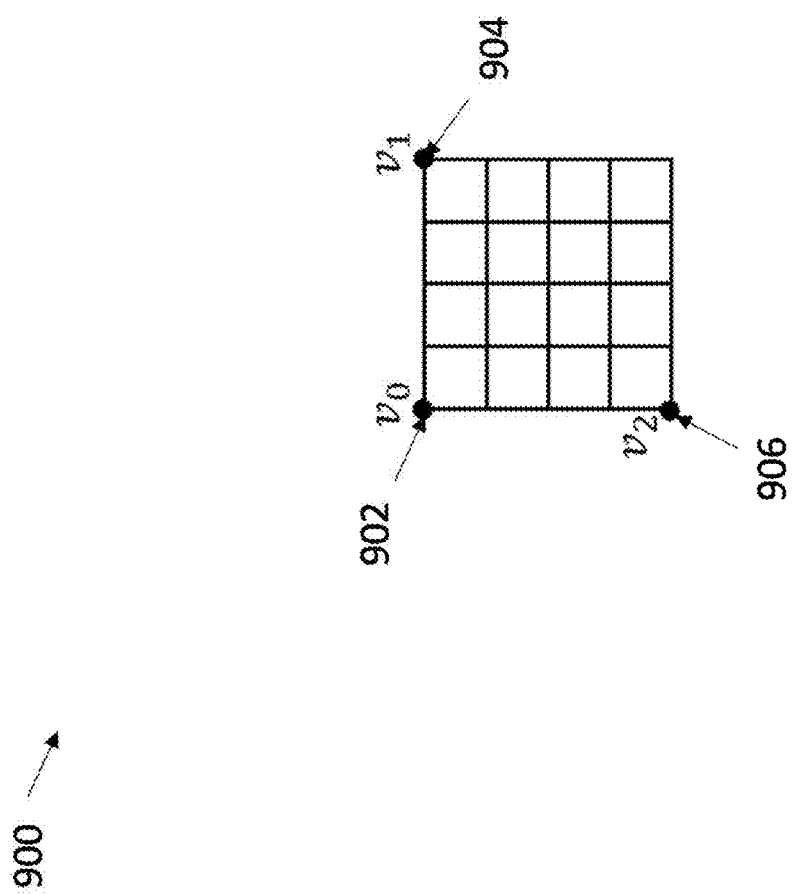
FIG. 9 is a diagram showing the position of the control points for an affine block using 6-parameter affine model, according to some examples.

In some embodiments, for affine model with six parameters, the MV for each sub-block can be derived by using Equation 5:

$$\begin{cases} v_x = \frac{v_{1x} - v_{0x}}{W}x + \frac{v_{2x} - v_{0x}}{H}y + v_{0x} \\ v_y = \frac{v_{1y} - v_{0y}}{W}x + \frac{v_{2y} - v_{0y}}{H}y + v_{0y} \end{cases} \quad \text{Equation 5}$$

where:

W is the block width, and $V_0$, $V_1$ and $V_2$ are the three control points at the corner of current block. FIG. 9 is a diagram 900 showing the position of the control points for an affine block using 6-parameter affine model, according to some examples. As shown, control points $V_0$, $V_1$ and $V_2$ are located at positions 902, 904 and 906, respectively.

Figure 10:
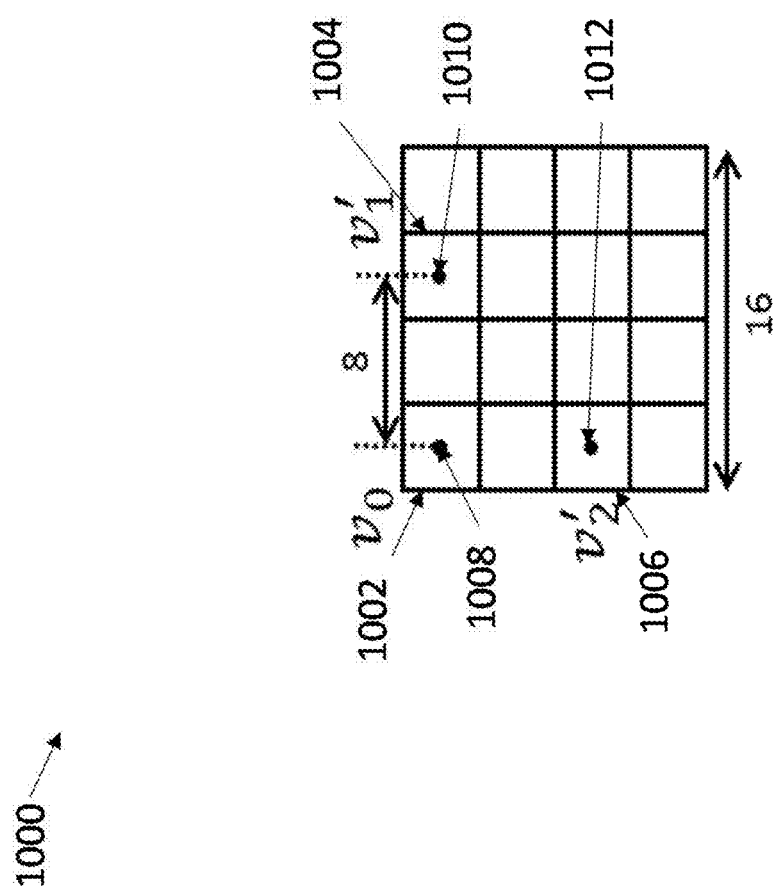
FIG. 10 is a diagram showing an example of modified control point positions for a 6-parameter affine model, according to some embodiments.

In some embodiments, the location of one or more of the control points for a 6-parameter affine model can be moved from the corner positions (e.g., as shown in FIG. 9). As described herein, for example, the control point location(s) can be moved to let the MVs better represent the sub-block when being referenced and/or to avoid over-complicating the division required to determine the MVs. FIG. 10 is a diagram 1000 showing an example of modified control point positions for a 6-parameter affine model, according to some embodiments. The diagram 1000 uses sub-blocks 1002, 1004 and 1006, which include the control points $v_0$, $v_1$, and $v_2$ at center locations 1008, 1010 and 1012, respectively. In this example, compared to the example 900 shown in FIG. 9, the control point $v_0$ is in the upper-left sub-block 1002, while control point $v_1$ is moved to sub-block 1004 (which is one sub-block to the left of the upper-right sub-block) and control point $v_2$ is moved to sub-block 1006 (which is one sub-block above the lower-left sub-block). As shown, the block is a 16×16 block, such that the distance between $v_0$ and $v_1$ is 8 (or $2^3$).

After moving the location of the control points (e.g., as shown in FIG. 10), the sub-block's MV can be derived by using Equation 6:

$$\begin{cases} v_x = \frac{v'_{1x} - v_{0x}}{W'}x - \frac{v'_{2x} - v_{0x}}{H'}y + v_{0x} \\ v_y = \frac{v'_{1y} - v_{0y}}{W'}x + \frac{v'_{2y} - v_{0y}}{H'}y + v_{0y} \end{cases} \quad \text{Equation 6}$$

where:

$v_1' = (v_{1x}', v_{1y}')$ and $v_2' = (v_{2x}', v_{2y}')$, are the center MVs of the new control points;

W' is the new distance between the top-left control point and the top-right control point; and H' is the new distance between the top-left control point and the bottom-left control point.

Reference Index Reorder for AMVP Mode

In some embodiments, the reference frame index can be reordered according to the reference frame of the candidate in the merge list.

Since the merge candidates with smaller index are chosen more frequently, reference frame in those candidates may also be chosen more frequently in AMVP mode.

In some embodiments, only the reference frame of the first candidate in the merge list will be reordered to index 0 in AMVP mode. For example, if the reference frame of the first candidate in the merge list is frame 5, whose original reference frame index is equal to 2, then in AMVP mode, the reference index of frame 5 will be changed to 0, the reference index for reference frame with original reference index equal to 0 will be changed to 1, and the reference index for reference frame with original reference index equal to 1 will be reorder to 2. In some embodiments, the reference index of reference index equal to 0 and 2 can be swapped. For example, if the reference frame of reference index equal to 2 is frame 5, and the reference frame of reference index equal to 0 is frame 3, then the reordered reference index of frame 5 and frame 3 will be 0 and 2 respectively.

In some embodiments, more than one reference frame's reference frame index can be reordered. The reordered index depends on the merge candidate's merge index. For example, if a codec uses the first three merge candidates to reorder the reference frame index in AMVP mode, when the reference frame of the first merge candidate is frame 5, the reference frame of the second merge candidate is frame 5, and the reference frame of the third merge candidate is frame 3, then the reference frame index of frame 5 can become 0 and the reference frame index of frame 3 can become 1. In some embodiments, the reference frame index of frame 5 and frame 3 will be first reordered, and the rest of the reference index will be filled by the rest of the reference frame starting from the one with the smallest original reference index. For example, if the original reference index 0, 1, 2, 3 correspond to frame 1, 4, 3, 5, respectively, then the reordered reference index will become reference index 0, 1, 2, 3 corresponds to frame 5, 3, 1, 4, respectively. In some embodiments, the reference frame can be swapped. For example, if the original reference index 0, 1, 2, 3 correspond to frame 1, 4, 3, 5, respectively, then the reordered reference index will become reference index 0, 1, 2, 3 corresponds to frame 5, 3, 4, 1, respectively.

Partial Coefficient Coding

Figure 11:
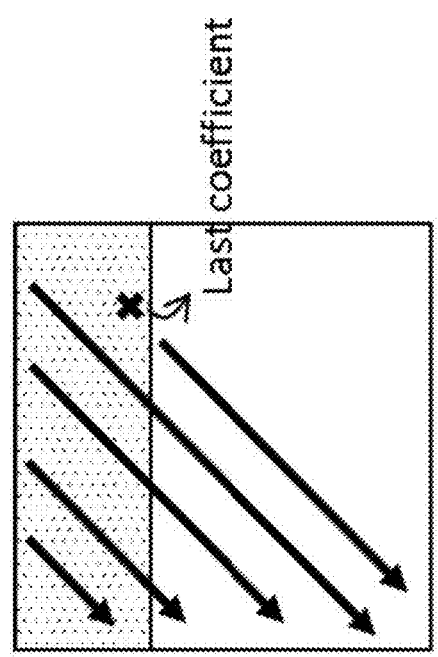
FIG. 11 is a diagram showing an example of redundant coefficient coding, according to some embodiments.
Figure 12:
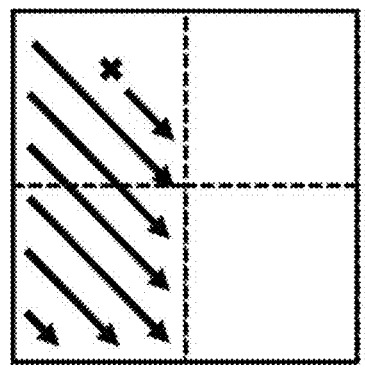
FIG. 12 is a diagram showing an example of scanning only partial coefficient in one coefficient block, according to some embodiments.
Figure 13:
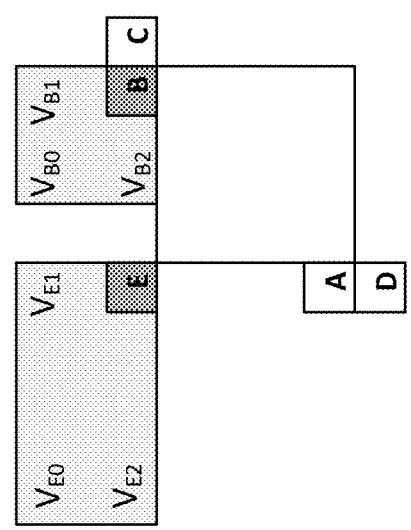
FIG. 13 shows a diagram of affine coded block B and block E, according to some examples.

The inventors have discovered and appreciated that using diagonal scanning method for coefficient can introduce redundancy when most of the non-zero coefficient appear in a small region. For example, if most of the non-zero coefficients are in the upper region of current block as shown in FIG. 11, the coefficient coding for the bottom region will be a waste. The techniques described herein first partition one coefficient block into multiple regions, and depending on the position of the last coefficient, a flag will be signaled to indicate whether only partial coefficients need to be scanned. In some embodiments, one coefficient block is partitioned into four regions. In one example, these four region can be in the same size. If the last coefficient is at the position inside the top-right region, a flag is signaled to indicate whether only the coefficients in the top-left and top-right regions need to be scanned. An example where only partial coefficients are scanned is shown in FIG. 12. In the other embodiment, one coefficient block is partitioned into four regions with same size, if the last coefficient is in the bottom-left region, a flag is signaled to indicate whether only the coefficients in the top-left and bottom-left regions need to be scanned. In some embodiments, if the last coefficient is in the bottom-right region, all coefficients in current block need to be scanned, no additional flag is required. In some embodiments, the current block can be divided into four regions where the four regions can be in different size. The top-left region can be smaller than other three parts, or the area of the top-left+top-right regions is smaller than the area of the bottom-left+bottom-right regions, and/or the area of the top-left+bottom-left regions is smaller than the area of the top-right+bottom-right regions.

In some embodiments, this partial coefficient coding is only applied to intra predicted block. In some embodiments, this partial coefficient coding is only applied to intra predicted block, and only applied to some intra mode or some intra MPM mode. In some embodiments, this partial coefficient coding is only applied to inter predicted block. In some embodiments, this partial coefficient coding is only applied to non-square block. In some embodiments, this partial coefficient coding is only applied to square block. In some embodiments, this partial coefficient coding is only applied to the block size/area/width/height smaller than some threshold. In some embodiments, this partial coefficient coding is only applied to the block size/area/width/height larger than some threshold. In some embodiments, this partial coefficient coding is only applied when using some transform, e.g. DCT-5/8 and/or DST-7. FIG. 11 is a diagram 1100 showing an example of redundant coefficient coding, according to some embodiments. FIG. 12 is a diagram 1200 showing an example of scanning only partial coefficient in one coefficient block, according to some embodiments.

Control Point Position

Figure 15:
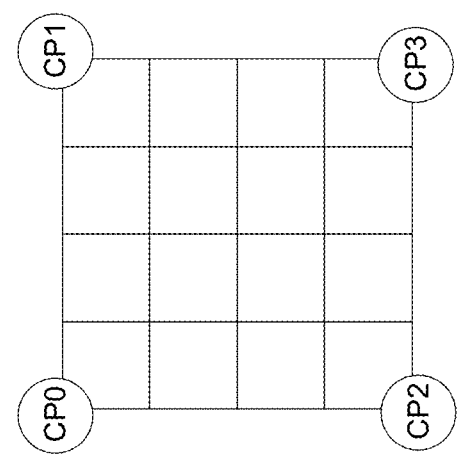
FIG. 15 is a diagram showing the control point positions at the four corners of the current block, according to some examples.
Figure 16:
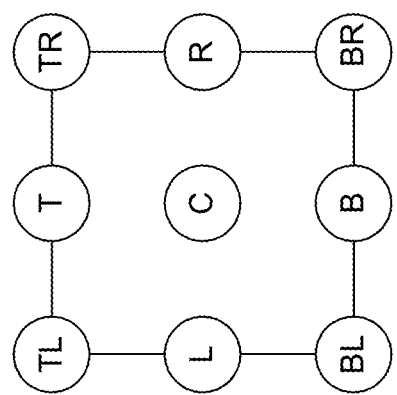
FIG. 16 is a diagram showing control point positions of a sub-block, according to some examples.

In affine motion modeling, the MV of each sample or each sub-block is derived from the control point MVs. The control point position can be the four corners of the current block, as shown in diagram 1500 of FIG. 15. In FIG. 15, a current block is divided into several sub-blocks. For the top-left sub-block, the control point is at the TL (top-left) position of the sub-block as shown in the diagram 1600 in FIG. 16. For the top-right sub-block, the control point is at the TR (top-right) position of the sub-block. For the bottom-left sub-block, the control point is at the BL position of the sub-block. For the bottom-right sub-block, the control point is at the BR position of the sub-block.

Figure 17:
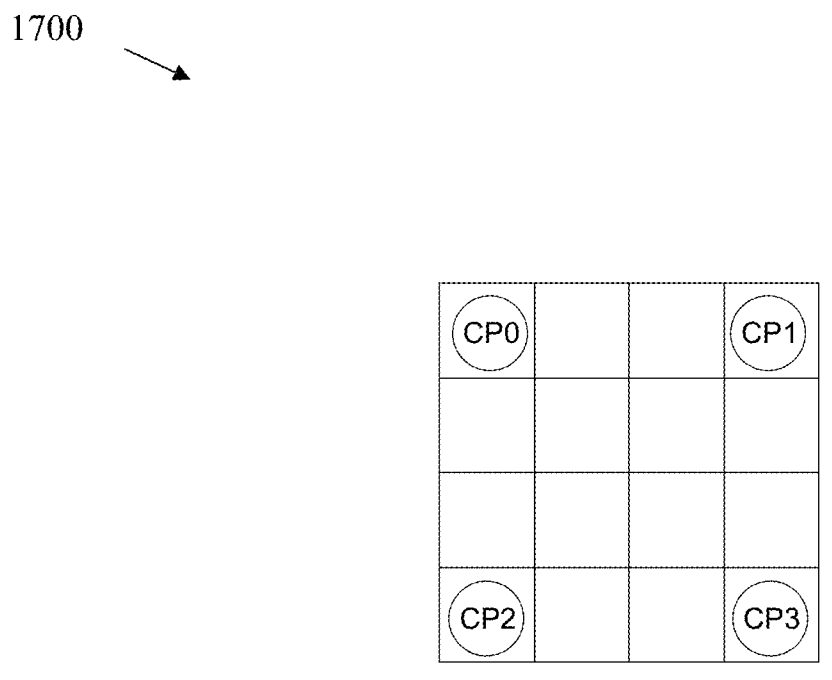

The control points of the current block can be changed. In one embodiment, the control points can be the center position (e.g., position C in FIG. 16) of four corner sub-blocks, as shown in diagram 1700 of FIG. 17.

In some embodiments, for example, when the center position (e.g., the position C in FIG. 16) of the four corner sub-blocks are used as the control points to derive the affine control point MVs, the MV difference (e.g. $V_{B2\_x} - V_{B0'\_x}$) is multiplied by a scaling factor (e.g. (posCurPU_Y−posB2_Y)/RefPU$_B$_width and (posCurPU_Y−posB2_Y)/(posB3_X−posB2_X) as described herein). If the denominator of the scaling factor is a power of 2, the simple multiplication and shift can be applied. However, if the denominator of the scaling factor is not a power of 2, the divider is required. The divider requires a lot of silicon area. To reduce the implementation cost, the divider can be replaced by a look-up table, multiplier, and shifter. Since the denominator of the scaling factor is the control point distance of the reference block, the value is smaller than the CTU size and is related to the possible CU size. Therefore, the possible values of the denominator of the scaling factor are limited. For example, the value can be a power of 2 minus 4, e.g. {4, 12, 28, 60, 124}. For these denominators (such as D), a list of beta values can be predefined. The "N/D" can be replace by N*K>>L, where N is the numerator of the scaling factor. L can be a fixed value. K is related to D and can be derived from a look-up table. For example, for a fixed L, the K value depends on D and can be derived by using the Table 1 or Table 2 below. For example, the L can be 10. The K value is equal to {256, 85, 37, 17, 8} for D equal to {4, 12, 28, 60, 124}.

TABLE 1

| | | | | L | | | | |
|---|---|---|---|---|---|---|---|---|
| K = | 7 | 8 | 9 | 10 | 11 | 12 | 13 | 14 |
| D 4 | 32 | 64 | 128 | 256 | 512 | 1024 | 1536 | 2048 |
| 12 | 11 | 21 | 43 | 85 | 171 | 341 | 512 | 683 |
| 28 | 5 | 9 | 18 | 37 | 73 | 146 | 219 | 293 |
| 60 | 2 | 4 | 9 | 17 | 34 | 68 | 102 | 137 |
| 124 | 1 | 2 | 4 | 8 | 17 | 33 | 50 | 66 |

TABLE 2

| | | | | L | | | | |
|---|---|---|---|---|---|---|---|---|
| K = | 7 | 8 | 9 | 10 | 11 | 12 | 13 | 14 |
| D 4 | 32 | 64 | 128 | 256 | 512 | 1024 | 1536 | 2048 |
| 12 | 11 | 22 | 43 | 86 | 171 | 342 | 513 | 683 |
| 28 | 5 | 10 | 19 | 37 | 74 | 147 | 220 | 293 |
| 60 | 3 | 5 | 9 | 18 | 35 | 69 | 103 | 137 |
| 124 | 2 | 3 | 5 | 9 | 17 | 34 | 50 | 67 |

In another embodiment, if the distance of two affine control points is not a power of 2, it can be multiplied by a scaling factor to simulate the MVD of the two control points with distance equal to a power of 2. For example, if the distance between two control point MVs is 124, the MVD of these two control points can be multiplied by 128/124 to simulate the MVD of two control points with distance equal to 128. Therefore, for denominators (such as D) equal to {4, 12, 28, 60, 124, or 252}, the scaling factor of {8/4, 16/12, 32/28, 64/60, 128/124, 256/252} can be used. The scaling factor of "M/D" can be replace by P>>L, where M is equal to D+sub-block size (e.g. 4), and L can be a fixed value. P is related to D and can be derived from a look-up table. For example, for a fixed L, the P value depends on D and can be derived using the Table 3 or Table 4 below.

TABLE 3

| | | | | L | | | | |
|---|---|---|---|---|---|---|---|---|
| K = | 7 | 8 | 9 | 10 | 11 | 12 | 13 | 14 |
| D 4 | 256 | 512 | 1024 | 2048 | 4096 | 8192 | 12288 | 16384 |
| 12 | 171 | 341 | 683 | 1365 | 2731 | 5461 | 8192 | 10923 |
| 28 | 146 | 293 | 585 | 1170 | 2341 | 4681 | 7022 | 9362 |
| 60 | 137 | 273 | 546 | 1092 | 2185 | 4369 | 6554 | 8738 |
| 124 | 132 | 264 | 529 | 1057 | 2114 | 4228 | 6342 | 8456 |

TABLE 4

| | | | | L | | | | |
|---|---|---|---|---|---|---|---|---|
| K = | 7 | 8 | 9 | 10 | 11 | 12 | 13 | 14 |
| D 4 | 257 | 513 | 1025 | 2049 | 4097 | 8193 | 12289 | 16385 |
| 12 | 171 | 342 | 683 | 1366 | 2731 | 5462 | 8193 | 10923 |
| 28 | 147 | 293 | 586 | 1171 | 2341 | 4682 | 7022 | 9363 |
| 60 | 137 | 274 | 547 | 1093 | 2185 | 4370 | 6554 | 8739 |
| 124 | 133 | 265 | 529 | 1058 | 2115 | 4229 | 6343 | 8457 |

In another embodiment, the scaling factor can be replaced by using the MV scaling method used in AMVP and/or merge candidate derivation. The MV scaling module can be reused. For example, the motion vector mv is scaled as follows:

$$tx=(16384+(Abs(td)>>1))/td$$

$$distScaleFactor=Clip3(-4096,4095,(tb*tx+32)>>6)$$

$$mv=Clip3(-32768,32767,Sign(distScaleFactor*mvLX)*((Abs(distScaleFactor*mvLX)+127)>>8))$$

where td is equal to the denominator and tb is equal to the numerator. For example, tb can be (posCurPU_Y−posB2_Y) and td can be (posB3_X−posB2_X) as described herein.

In another example, when the distance of the corner MVs (e.g. distance of the control points MVs, e.g. posB3_X−posB2_X) is not a power of 2 (e.g. when the center position (the position C in FIG. 16) of four corner sub-blocks are used as the control points), it requires a divider to derive the affine candidate. In one embodiment, the reference MV selection mentioned above can be used. The distance of the selected reference MV for affine candidate derivation is a power of 2. The reference MV selection depends on the position of the reference block, the height/width of reference block, the position of current CU, the height/width of current CU, or a combination of the above information. For example, a MV of the top-left sub-block of the reference block can be selected as the first reference MV. The second MV can be the MV of the sub-block right of the first MV with a distance of width/2, if the width/2 is a power of 2. The third MV can be the MV of the sub-block below to the first MV with a distance of height/2, if the height/2 is a power of 2. For example, if the position of the first MV is (pos1_x, pos1_y), the position of the second MV can be (pos1_x+width/2, pos1_y), and the position of the third MV can be (pos1_x, pos1_y+height/2). In another example, if the bottom-left MV of the reference block is used as the first MV, the second MV can be the MV of the sub-block right of the first MV with a distance of width/2, if the width/2 is a power of 2. The third MV can be the MV of the sub-block above to the first MV with a distance of height/2, if the height/2 is a power of 2. For example, if the position of the first MV is (pos1_x, pos1_y), the position of the second MV can be (pos1_x+width/2, pos1_y), and the position of the third MV can be (pos1_x, pos1_y−height/2). In another example, if the bottom-right MV of the reference block is used as the first MV, the second MV can be the MV of the sub-block left to the first MV with a distance of width/2, if the width/2 is a power of 2. The third MV can be the MV of the sub-block above to the first MV with a distance of height/2, if the height/2 is a power of 2. For example, if the position of the first MV is (pos1_x, pos1_y), the position of the second MV can be (pos1_x−width/2, pos1_y), and the position of the third MV can be (pos1_x, pos1_y−height/2). In another example, if the top-right MV of the reference block is used as the first MV, the second MV can be the MV of the sub-block left to the first MV with a distance of width/2, if the width/2 is a power of 2. The third MV can be the MV of the sub-block below to the first MV with a distance of height/2, if the height/2 is a power of 2. For example, if the position of the first MV is (pos1_x, pos1_y), the position of the second MV can be (pos1_x−width/2, pos1_y), and the position of the third MV can be (pos1_x, pos1_y+height/2). Note that if the width/height is not a power of 2, the maximum power of 2 value that is smaller than the width/height value can be used. For example, if the position of the first MV is (pos1_x, pos1_y), the position of the second MV can be (pos1_x−(1<<floor(log 2(width))), pos1_y. In general, if the MV of the center position of the sub-block is used for affine candidate derivation, the distance between two selected reference MVs can be (1<<floor(log 2(width−4)) or (1<<floor(log 2(height−4)). Note that, in some cases, only the first MV and the second MV, or only the first MV and the third MV, are used for affine candidate derivation.

Figures 18A, 18B:
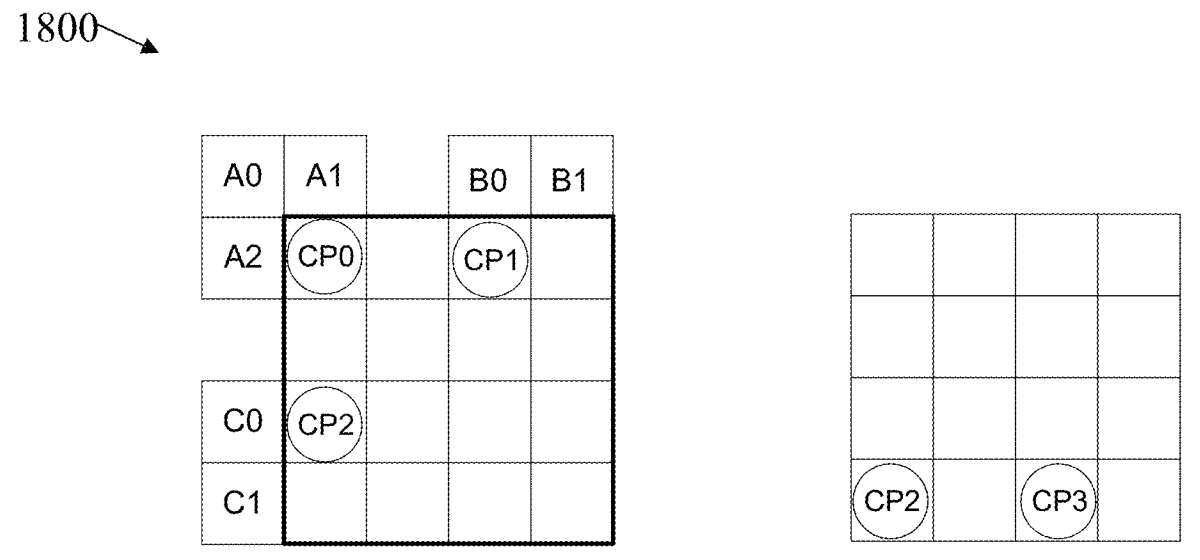

In one embodiment, the MV position of MVP/MVD signaling and/or the MV position of the control points for affine candidate derivation can be repositioned to a first MV, a second MV and/or a third MV. The distance of the first MV and the second MV and/or the distance of the first MV and the third MV can correspond to the width and height. For example, the first MV can be the center position MV of the top-left sub-block as shown in the diagram 1800 in FIG. 18A. The second MV can be the MV right of the first MV by width/2. The third MV can be the MV below the first MV by height/2, as shown in FIG. 18A. For deriving the affine candidate (e.g. AMVP or merge candidate) of the current block, the MVs in the position of the first, the second, and/or the third MV are derived, as shown as the CP0, CP1, CP2 in FIG. 18A. For AMVP mode, the MVD of these positions is signaled. From these two or three control point MVs, the MV of each sub-block can be derived and stored. The stored MVs are also used for motion compensation and as the reference MV for the neighboring blocks. For example, the neighboring MVs in CP0, CP1, and/or CP2 are used to derive the control point MVs of CP0, CP1, and/or CP2 of the current block. In one embodiment, for the corner-derived affine candidate, the neighboring block positions change to those of the blocks near the new control point positions. For example, the MVs in block A0, A1, A2, B0, B1, C0, C1 in FIG. 18A are used.

The temporally collocated MV can also be used to derive the corner derived affine candidate or to fill the candidate list when the candidate list is not full. The temporal candidate can be the position of (top-left_pos1_x+width/2, top-left_pos1_y+height/2). For example, the col-1 position in FIG. 18A. The col-2, col-3, and col-4 position in FIG. 18A can also be used.

In some embodiment, the CTU/CTU-row line buffer constraint can also be applied. For example, when the reference block is in the above CTU/CTU-row, the bottom-left MV of the reference block is used as the first MV; the second MV can be the MV of the sub-block right to the first MV with a distance of width/2, if the width/2 is a power of 2; or, if the bottom-right MV of the reference block is used as the first MV, the second MV can be the MV of the sub-block left to the first MV with a distance of width/2, if the width/2 is a power of 2. For example, the MVs of CP2 and CP3 in FIG. 18B can be used. With these two MVs, the four-parameter affine candidate can be derived.

Note that, according to some embodiments, the derived control points MVs or the affine parameters can be used for inter mode coding as the MVP or the merge mode coding as the affine merge candidates.

AMVP MVP Set Derivation and Filling the Candidate List

Figure 19:
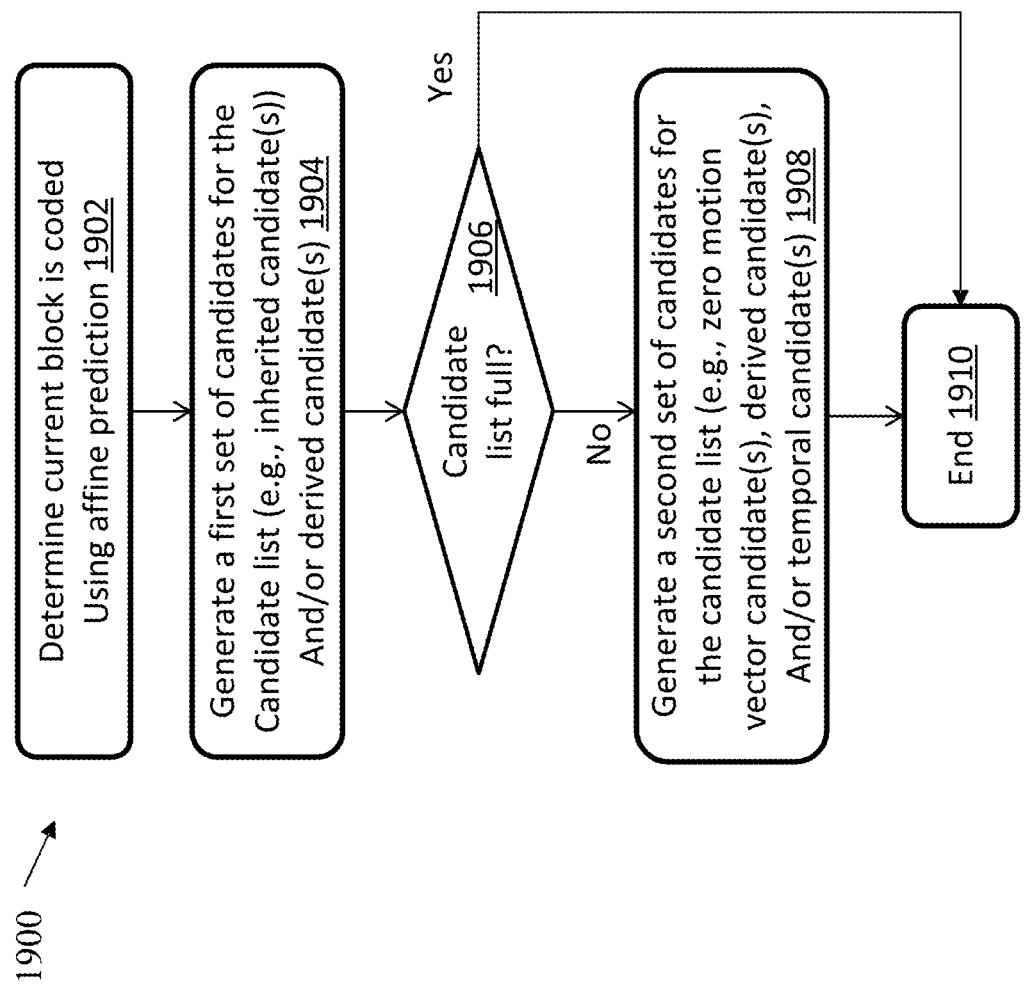
FIG. 19 is a flow chart showing an exemplary computerized method for generating a candidate list, according to some embodiments of the techniques described herein.

In some embodiments, affine candidates can be generated for the affine candidate list. In some embodiments, a set of candidates (e.g., inherited candidates and/or constructed candidates) can be added to the candidate list. If the candidate list is not full after adding the first set of candidates, the candidate list can be filled with a second set of candidates (e.g., zero motion vector candidates, additional derived candidates, and/or temporal candidates). FIG. 19 is a flow chart showing an exemplary computerized method 1900 for generating a candidate list, according to some embodiments of the techniques described herein. The method 1900 can be executed by various devices, such as by encoders and/or decoders. At step 1902, the device determines that the current block of video data is coded using affine prediction. At step 1904, the device generates a first set of candidates of the candidate list for the current block. The first set of candidates can include inherited candidates and/or constructed candidates. For example, the device can determine one or more inherited candidates that each inherits an affine model of an associated neighboring block. As another example, the device can derive one or more constructed candidates that are each based on a plurality of associated neighboring blocks of the current block. In some embodiments, if the affine prediction is a four parameter affine mode, each candidate in the candidate list includes two motion vectors: a first motion vector for the first control point, and a second motion vector for the second control point. If the affine prediction is a six parameter affine mode, each candidate in the candidate list includes three motion vectors: a first motion vector for the first control point, a second motion vector for the second control point, and a third motion vector for the third control point.

At step 1906, the device determines, after generating the first set of candidates, whether the candidate list is full. If the candidate list is full, the method proceeds to step 1910 and ends. If the candidate list is not full, the method proceeds to step 1908 and fills the candidate list by generating a second set of candidates of the candidate list. In some embodiments, the device can generate one or more zero motion vector candidates, one or more additional derived candidates based on the plurality of associated neighboring blocks of the current block, and/or a temporal motion vector candidate based on a temporal collocated picture. Upon filling the candidate list at step 1908, the method proceeds to step 1910 and ends.

Referring to step 1904, in some embodiments inherited affine candidates can be added that inherit the affine model of a neighboring block, such that the control point MVs for the candidate are derived from the same neighboring block. As another example, in some embodiments, the constructed candidates can be generated that include MVs from different neighboring blocks. In some embodiments, the inherited candidates can be inserted into the candidate list before the constructed candidates.

In some embodiments, to determine the constructed candidates, the techniques can determine the first available MV from a determined set or sets of neighboring blocks. Referring to FIG. 5, for example, the techniques can find the first available MV for V0 in A0, A1 and A2, which can be referred to as $MV_A$. As another example, the techniques can find the first available MV for V1 in B0 and B1, which can be referred to as $MV_B$. As a further example, the techniques can find the first available MV for V2 (not shown in FIG. 5) in C0 and C1, which can be referred to as $MV_C$. In some embodiments, the techniques can find the MV in both lists that point to the same target reference picture. For example, the techniques could find {B0-L0, B0-L1, B1-L0, B1-L1}.

In some embodiments, one or more orders can be used to determine the first available MV. As described herein, for example, the first available MV in set-A is used. The searching order can be in the order of {A0, A1, A2} or {A0, A2, A1}. In some embodiments, a limited set can be used. For example, only A0 may be used for set-A. For set-B, for example, the searching order can be in the order of {B0, B1} or {B1, B0}. In some embodiments, a limited set such as only B0 can be used for set-B. In some embodiments, only B1 is used for set-B. For the Set-C, for example, the searching order can be in the order of {C0, C1} or {C1, C0}.

In some embodiments, only C0 is used for set-C. In some embodiments, only the C1 is used for set-C. In some embodiments, only A0, B1, and C1 are used. In some embodiments, only A0 is used for Set-A, the search order in set-B is {B1, B0}, and the search order in set-C is {C1, C0}. For set C, the MV scaling can be applied if the reference picture in LIST_0 and LIST_1 are not the same as the target reference picture. If one of the MVs in set-C is available, the MV scaling is not applied to set-B and set-C. Otherwise, the MV scaling can be applied to set-B and set-C.

In some embodiments, the techniques may only add one constructed candidate to the candidate list (e.g., after adding an inherited candidate or candidates). For example, for a four parameter affine mode, the techniques can insert the candidate {$MV_A$, $MV_B$} into the candidate list. As another example, for a 6-parameter affine mode, the techniques can insert the {$MV_A$, $MV_B$, MVc} into the candidate list.

Referring to step 1906, in some embodiments, if after all the affine inherited candidates and the constructed candidate are added to the candidate list, the candidate list is still not full, one or more zero MV sets can be added. In some embodiments, for an affine merge candidate, in the P-slice, two or three zero MVs (MVx=0, MVy=0 and/or MVz=0) can be used for the two or three control point MVs and added into the candidate list. In AMVP mode (or non-merge mode), for example, the zero MV sets with reference picture equal to the current target reference picture are added until the candidate list is full. In merge mode, for example, for a P-slice, the LIST_0 zero MV set is used. For a B-slice, the LIST_0 and LIST_1 zero MV set can be used.

In some embodiments, the zero MV with different reference indices can be inserted into the candidate list. The device can determine a number of reference pictures associated with the candidate list, and generate the number of zero motion vector candidates, such that each of the generated zero motion vector candidates has a unique refIdx that is selected from 0—(the number of reference pictures−1). For example, if the List_0 has 3 reference pictures, three zero MV sets with refIdx=0, 1, and 2 can be added to the candidate list. If the candidate list is not full, the zero MV sets with refIdx=0 are added until the candidate list is full. In some embodiments, the zero MV sets with refIdx=0 are added until the candidate list is full. In some embodiments, if after all the affine inherited candidates and the constructed candidates are added, the candidate list is still not full, the normal AMVP candidate or normal merge candidate can be added to the candidate list. The two or three control point MVs can be filled with the normal AMVP candidate MV or the normal merge candidate MV.

In some embodiments, if after all the affine inherited candidates and the constructed candidate are added, the candidate list is still not full, the (e.g., first) available $MV_A$ in set A (A0, A1, and A2) and the (e.g., first) available $MV_B$ in set B (B0 and B1), and the (e.g., first) available $MV_C$ in set C (C0 and C1) can be used to fill the affine candidate list. In some examples, the affine candidates with the same MV can be used. In some embodiments, the two/three control point MVs (e.g., for four or six parameter models) can all be the same MV from set A, B, or C. For example, for a 6-parameter affine model, the three control point MVs of the candidate can all include the same MV at each control point, such as {$MV_A$, $MV_A$, $MV_A$}, {$MV_B$, $MV_B$, $MV_B$}, {$MV_C$, $MV_C$, $MV_C$}. As another example, for a 4-parameter affine model, the two control point MVs of the candidate can each include the same MV, such as {$MV_A$, $MV_A$}, {$MV_B$, $MV_B$}, {$MV_C$, $MV_C$}.

In some embodiments, the filling order used to generate the candidates can be one or more of A→B→C, A→C→B, C→B→A, C→A→B, B→A→C, or B→C→A for a 6-parameter model. In some embodiments, the filling order used to generate the candidate can be one or more of A→B, A→C, C→B, C→A, B→A, or B→C for a 4-parameter model. The available MVs in set A, B, C can be checked in a predetermined order when used to generate candidates to add to the candidate list. For example, as described herein the order can be {A0, A1, A2}, {B0, B1} and {C0, C1}. In some embodiments, after generating candidates with the same MVs at each control point as described herein, if the list is still not full, affine candidate(s) with all zero MVs as described herein can be used to fill the candidate list.

In some embodiments, if the candidate list is not full (e.g., after adding inherited and/or constructed candidates), the weighted average of the $MV_A$, $MV_B$, and $MV_C$ can be used. For example, the weighted average of the $MV_A$ and $MV_B$, the weighted average of the $MV_A$ and $MV_C$, or the weighted average of the $MV_B$ and $MV_C$ can be used to generate candidates to fill the candidate list.

Figure 14:
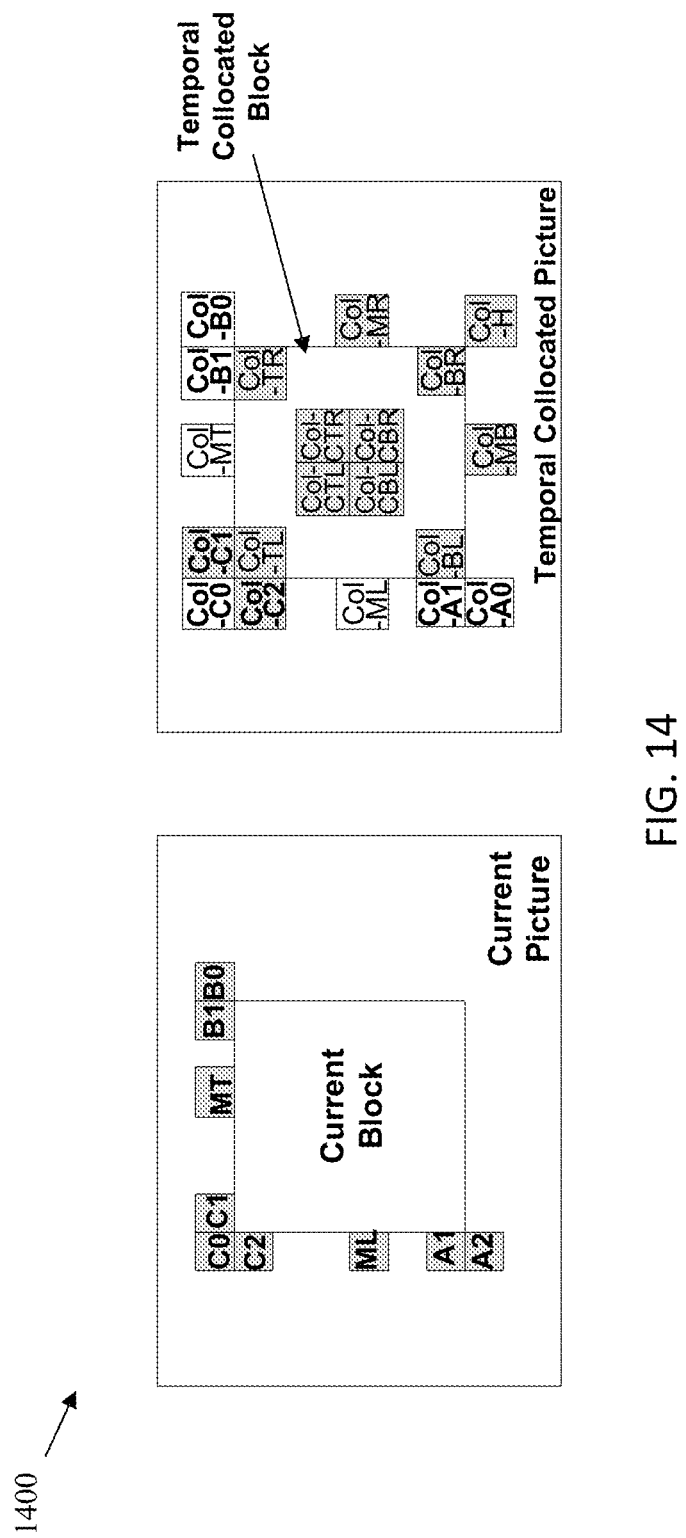
FIG. 14 is a diagram illustrating that an additional MV can be from the temporally collocated MVs including Col-BR, Col-H, Col-BL, Col-A1, Col-A0, Col-B0, Col-B1, or Col-TR, according to some examples.

In affine MVP derivation, the corner spatial neighboring MVs can be used to derive the control point MVs, e.g. the MVs in set-A, set-B, and set C in FIG. 5. In some embodiments, the techniques described herein can use temporally collocated MVs for affine candidate derivation, which can be referred to as $MV_{Col}$. The scaled temporally collocated MV in position Col-H (e.g., adjacent to the bottom-right sub-block of the temporal collocated block to the current block) and/or Col-CBR (e.g., a center bottom-right sub-block of the temporal collocated block to the current block), as shown in the diagram 1400 in FIG. 14, can be used. In some embodiments, the MV of Col-H can be first selected, if available. If the MV of Col-H is not available, the MV of Col-CBR can be used. In some embodiments, the position of the Col-H can be considered. For example, if the position of Col-H is not inside of the collocated CTU row (e.g. the position of Col-H is on the top CU row of a CTU, or, the Col-BR is on the bottom CU row of the CTU), or the Col-H is unavailable, the MV of Col-CBR can be used. In some embodiments, the temporally collocated MV (e.g., from Col-H or Col-CBR) can be used for each control point.

In some embodiments, the temporal candidate can be filled before the $MV_A$, $MV_B$, and $MV_C$, and/or the weighted average of the $MV_A$, $MV_B$, and $MV_C$. For example, for a 6-parameter model, the following four 3-control point MVs can be added to fill the list: {$MV_{Col}$, $MV_{Col}$, $MV_{Col}$}, {$MV_A$, $MV_A$, $MV_A$}, {$MV_B$, $MV_B$, $MV_B$}, {$MV_C$, $MV_C$, $MV_C$}. As another example, for a 4-parameter model, the following four 2-control point MVs can be added to fill the list: {$MV_{Col}$, $MV_{Col}$}, {$MV_A$, $MV_A$}, {$MV_B$, $MV_B$}, {$MV_C$, $MV_C$}.

In some embodiments, temporal MV can be filled after $MV_A$, $MV_B$, and $MV_C$, and/or the weighted average of the $MV_A$, $MV_B$, and $MV_C$. In some embodiments, a pruning process can be applied for MV filling. For example, if the filling order is $MV_{Col}$, $MV_A$, $MV_B$, and $MV_C$, the $MV_{Col}$ is added into the list first. The techniques can include comparing the latter added MV candidate (e.g. $MV_A$, $MV_B$, and $MV_C$) with the $MV_{Col}$. If the latter added MV is the same as one of the filled MVs, the latter added MV is not put into the candidate list. In some examples, the to-be-added filled MV can be compared with the MV set already-in-the-list. If all the control point MVs are the same, the to-be-added filled MV is not put into the list.

In some embodiments, the temporally collocated MV can be used to replace the MV in set-A, set-B, and set C. For example, if the first available MV in Set-A is not available, the $MV_A$ can be replaced by the temporally collocated MV. In some embodiments, the temporally collocated MV can also be used to fill the MVP set when the MVP set candidate list is not full.

In some embodiments, if the $MV_A$ is not available but two of the MVs in {$MV_B$, $MV_C$, $MV_{Col}$} are available (e.g. $MV_B$ and $MV_C$), the $MV_A$ can be derived from the available two MVs.

In some embodiments, in affine inter mode (AMVP mode), if the affine model of the neighboring block is not the same as the current target, the neighboring block is not used to generate the inherited affine candidate. Only the neighboring block coded with the same affine model can be used. In another embodiment, the affine candidate generated from the neighboring block coded with the same affine model is inserted before the affine candidate generated from the neighboring block coded with the different affine model. In another embodiment, the affine candidate generated from the neighboring block coded with the different affine model is inserted before the affine candidate generated from the neighboring block coded with the same affine model.

In some embodiments, in affine merge candidate derivation, the 6-parameter affine model generated from the neighboring block coded with the 6-parameter affine model is inserted before the 4-parameter affine model generated from the neighboring block coded with the 4-parameter affine model. In another embodiment, in affine merge candidate derivation, the 4-parameter affine model generated from the neighboring block coded with the 4-parameter affine model is inserted before the 6-parameter affine model generated from the neighboring block coded with the 6-parameter affine model.

As described herein, various techniques can be used to generate candidates for the candidate list, including adding zero MVs, additional derived MVs, and/or temporal MVs. In some embodiments, the techniques can be used in a predetermined order to fill the list (e.g., after adding inherited and constructed candidates). For example, the techniques can add one or more additional derived candidates (e.g., that each have the same MV for each control point), a temporal candidate, and a zero MV candidate. For example, the list can be filled by adding {$MV_C$, $MV_C$, $MV_C$}, {$MV_S$, $MV_B$, $MV_B$}, {$MV_A$, $MV_A$, $MV_A$}, {$MV_{Col}$, $MV_{Col}$, $MV_{Col}$}, {$MV_{zero}$, $MV_{zero}$, $MV_{zero}$}. As another example, the list can be filled by adding {$MV_{Col}$, $MV_{Col}$, $MV_{Col}$}, {$MV_C$, $MV_C$, $MV_C$}, {$MV_S$, $MV_B$, $MV_B$}, {$MV_A$, $MV_A$, $MV_A$}, {$MV_{zero}$, $MV_{zero}$, $MV_{zero}$}.

Affine Candidate Derivation—all Same Model

The affine inherit candidate derivation reuses the affine model and/or the affine parameter of the neighboring block. In one example, if the neighboring block uses the 4-parameter affine model, the 4-parameter affine model affine candidate is derived; if the neighboring block uses the 6-parameter affine model, the 6-parameter affine model affine candidate is derived.

When deriving the affine AMVP candidates, several neighboring blocks are searched. In one embodiment, for each neighboring block, the MV in the same target reference list is checked. The MV in the reference list that is not the target reference list is not used.

In one embodiment, in affine candidate derivation (e.g. in affine merge candidate derivation or affine inter mode MVP candidate derivation), the 4-parameter affine model is always used. In one example, the 4-parameter affine model is always used in inherit affine candidate derivation regardless of the affine model of the reference block. If the reference block uses the 6-parameter affine model, only two of the reference control point MVs are used to derived the 4-parameter affine candidate. In one example, if the reference block is the above block (or above-right block or above-left block) of the current block, the bottom-left and bottom-right control point MVs are used. If the reference block is the left block (or bottom-left block or above-left block) of the current block, the above-right and bottom-right control point MVs are used. In another example, the 4-parameter affine model is always used in corner-derived/constructed affine candidate. The (first) available MV in set A (A0, A1, and A2) and the (first) available MV in set B (B0 and B1), the (first) available MV in set A (A0, A1, and A2) and the (first) available MV in set C (C0 and C1), or the (first) available MV in set B (B0 and B1) and the (first) available MV in set C (C0 and C1) can be used to derive the 4-parameter constructed affine candidate. For the affine candidate, only two control point MVs are constructed.

In another embodiment, the 6-parameter affine model is always used in inherited affine candidate derivation. In another embodiment, the 6-parameter affine model is always used in corner derived affine candidate derivation. In another embodiment, the 6-parameter affine model is always used in inherited affine candidate derivation and corner derived affine candidate. In one example, the 6-parameter affine model is always used in inherit affine candidate derivation regardless of the affine model of the reference block. If the reference block uses the 4-parameter affine model, only two of the reference control point MVs are used to derived two control points (e.g. top-left and top-right control point) of the current block. The third control point (bottom-left or bottom-right control point) can be derived from the two control points MVs of the reference block or the current block. The affine candidate is marked as a 6-parameter affine candidate in affine merge mode derivation. In another example, for all the affine coded block, if the 4-parameter affine model is used, the third control point MV (e.g. the bottom-left or bottom-right MV) is derived and stored. The affine coded block is also marked as a 6-parameter model. When performing the inherited affine model derivation, the 6-parameter affine model derivation is used (e.g. directly use the three corner control point MVs for affine candidate derivation without on-line deriving the third control point MV). In sub-block MV derivation in the affine coded block and motion compensation process, the 6-parameter affine model is used. In one embodiment, in affine inter mode (e.g., sometimes referred to as affine AMVP mode), if the 4-parameter affine model is selected, the two-control-point MVP pair list is generated. One of the MVP pairs is selected. Two MVD are coded and two control point MVs are constructed by the MVP pair and MVD pair. Then the third control point MV of the current is generated using the 4-parameter affine model. Then, this block is marked as the 6-parameter affine model or treated as the 6-parameter affine model. In sub-block MV derivation in the affine coded block and motion compensation process, the 6-parameter affine model is used. In another example, the 6-parameter affine model is always used in corner-derived/constructed affine candidate. Only the three control point MVs constructed affine candidate can be added into the candidate list. The (first) available MV in set A (A0, A1, and A2) and the (first) available MV in set B (B0 and B1) or the (first) available MV in set A (A0, A1, and A2) and the (first) available MV in set C (C0 and C1) can be used to derive the 6-parameter constructed affine candidate. If one or two of the control point MVs are not available, the missing control point MVs are derived from the available control point MVs by using the 4-parameter affine model, or using the same MV for the missing control point MVs, or replacing the missing control point MVs with temporal MVs. The two control point affine candidates can also be used. For example, the candidate of {top-left, top-right}, {top-left, bottom-left}, {top-right, bottom-right}, {bottom-left, bottom-right}, {top-left, bottom-right}, {top-right, bottom-left} can also be used. However, for this kind of two control point candidates, the 4-control point affine model is used to generate the missing control point MVs for the 6-parameter affine candidate. For example, for the {top-left, top-right} candidate, the bottom-left MV is generated. The 6-parameter {top-left, top-right, generated-bottom-left} candidate is used instead of the 4-parameter {top-left, top-right} candidate. In one embodiment, all the affine merge candidates are marked as 6-parameter affine candidates.

By using the techniques described herein, in some embodiments there may be no need to store the information of whether the 4-parameter or the 6-parameter affine model for current block or the reference block is used. In some embodiments, there is no need to use buffers to store this information. If the 6-parameter affine model is always used, in sub-block MV derivation in the affine coded block and motion compensation process, only the 6-parameter affine model is used.

BT-Split Context Modeling:

In JEM, the BT-split context model depends on: 2*QT-depth+1*BT-depth. According to the techniques described herein, the area of the neighboring block can be used for context modeling. If the area of the left and above CUs is smaller than that of the current CU, the first context is used. If the area of the left or above CU is smaller than that of the current CU, the second context is used. If the area of the left and above CU is equal to or larger than that of the current CU, the third context is used.

In another example, if the area of the left and above CU is equal to or smaller than that of the current CU, the first context is used. If the area of the left or above CU is equal to or smaller than that of the current CU, the second context is used. If the area of the left and above CU is larger than that of the current CU, the third context is used.

Any of the foregoing techniques can be implemented in encoders and/or decoders. For example, any of the techniques can be implemented in an MV derivation module of an encoder (e.g., encoder 200 in FIG. 2), and/or a MV derivation module of a decoder (e.g., decoder 300 in FIG. 3). Alternatively, any of the techniques described herein can be implemented as a circuit coupled to the MV derivation module of the encoder and/or the MV derivation module of the decoder, so as to provide the information needed by the MV derivation module.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for encoding or decoding video data, the method comprising:
   determining a current block of video data is coded using affine prediction;
   deriving a plurality of candidates of a candidate list for the current block, comprising:
      upon determining one or more inherited candidates are available, determining the one or more inherited candidates that each inherit an affine model of an associated neighboring block; and
      upon determining one or more constructed candidates are available, deriving the one or more constructed candidates that are each based on a plurality of associated neighboring blocks of the current block;
      upon determining the candidate list is not full, filling the candidate list by deriving other candidates of the candidate list, comprising:
         upon determining one or more additional derived candidates are available, deriving the one or more additional derived candidates based on the plurality of associated neighboring blocks of the current block, and adding the derived one or more additional derived candidates into the candidate list; and
         upon determining the candidate list is not full and one or more temporal motion vector candidate is available, deriving the one or more temporal motion vector candidates based on a temporal collocated picture, and adding the derived one or more temporal motion vector candidates into the candidate list; and
   upon determining the candidate list is not full after filling the candidate list by deriving the other candidates, filling the candidate list by deriving additional candidates needed to fill the candidate list, comprising deriving one or more zero motion vector candidates.

2. The method of claim 1, wherein:
   if the affine prediction is associated with a four parameter affine mode, each candidate in the candidate list comprises a first motion vector for a first control point and a second motion vector for a second control point; and
   if the affine prediction is associated with a six parameter affine mode, each candidate in the candidate list comprises the first and second motion vectors and a third motion vector for a third control point.

3. The method of claim 1, wherein deriving the one or more additional derived candidates that are based on the plurality of associated neighboring blocks of the current block comprises:
   determining a first available motion vector based on a first set of neighboring blocks; and
   deriving a first candidate comprising the first available motion vector for each control point of the first candidate.

4. The method of claim 3, further comprising:
   determining the candidate list is not full;
   determining a second available motion vector based on a second set of neighboring blocks that is different than the first set of neighboring blocks; and
   deriving a second candidate comprising the second available motion vector for each control point of the second candidate.

5. The method of claim 4, wherein:
   the first set of neighboring blocks neighbor a first sub-block of the current block associated with an upper-left control point, and the second set of neighboring blocks neighbor a second sub-block of the current block associated with an upper-right control point; or
   the first set of neighboring blocks neighbor the first sub-block, and the second set of neighboring blocks neighbor a third sub-block of the current block associated with a lower-left control point; or
   the first set of neighboring blocks neighbor the third sub-block, and the second set of neighboring blocks neighbor the second sub-block; or
   the first set of neighboring blocks neighbor the third sub-block, and the second set of neighboring blocks neighbor the first sub-block; or
   the first set of neighboring blocks neighbor the second sub-block, and the second set of neighboring blocks neighbor the first sub-block; or
   the first set of neighboring blocks neighbor the second sub-block, and the second set of neighboring blocks neighbor the third sub-block.

6. The method of claim 5, further comprising:
   determining the candidate list is not full;
   determining a third available motion vector based on a third set of neighboring blocks that is different than the first and second sets of neighboring blocks; and
   deriving a third candidate comprising the third available motion vector for each control point of the second candidate.

7. The method of claim 6, wherein:
   the first set of neighboring blocks neighbor a first sub-block of the current block associated with an upper-left control point, the second set of neighboring blocks neighbor a second sub-block of the current block associated with an upper-right control point, and the third set of neighboring blocks neighbor a third sub-block of the current block associated with a lower-left control point; or
   the first set of neighboring blocks neighbor the first sub-block, the second set of neighboring blocks neighbor the third sub-block, and the third set of neighboring blocks neighbor the second sub-block; or
   the first set of neighboring blocks neighbor the third sub-block, the second set of neighboring blocks neighbor the second sub-block, and the third set of neighboring blocks neighbor the first sub-block; or
   the first set of neighboring blocks neighbor the third sub-block, the second set of neighboring blocks neighbor the first sub-block, and the third set of neighboring blocks neighbor the second sub-block; or
   the first set of neighboring blocks neighbor the second sub-block, the second set of neighboring blocks neighbor the first sub-block, and the third set of neighboring blocks neighbor the third sub-block; or
   the first set of neighboring blocks neighbor the second sub-block, the second set of neighboring blocks neighbor the third sub-block, and the third set of neighboring blocks neighbor the first sub-block.

8. The method of claim 1, wherein deriving the one or more temporal motion vector candidates comprises:
   determining a motion vector is available from a block of the temporal collocated picture that is adjacent to a bottom-right sub-block of a temporal collocated block to the current block in the temporal collocated picture; and
   deriving one of the one or more temporal motion vector candidates comprising the motion vector for each control point of the one temporal motion vector candidate.

9. The method of claim 1, further comprising:
   determining a motion vector is not available from a block of the temporal collocated picture that is adjacent to a bottom-right sub-block of a temporal collocated block to the current block in the temporal collocated picture; and
   deriving one of the one or more temporal motion vector candidates comprising a motion vector from a center bottom-right sub-block of the temporal collocated block for each control point of the one temporal motion vector candidate.

10. The method of claim 1, wherein deriving the one or more temporal motion vector candidates comprises:
    determining a motion vector for one of the one or more temporal motion vector candidates based on the temporal collocated picture; and
    scaling the motion vector prior to deriving the one temporal motion vector candidate.

11. The method of claim 1, wherein deriving the one or more zero motion vector candidates comprises:
    determining a number of reference pictures associated with the candidate list; and
    deriving the number of zero motion vector candidates, wherein each of the derived zero motion vector candidates comprises a unique reference index selected from a set of whole numbers ranging from zero to the number minus one.

12. The method of claim 11,
    wherein each of the one or more zero motion vector candidates has a reference index of zero.

13. The method of claim 1, wherein deriving the other of candidates of the candidate list comprises using a same motion vector for each control point.

14. An apparatus configured to encode or decode video data, the apparatus comprising a processor in communication with memory, the processor being configured to execute instructions stored in the memory that cause the processor to:
    determine a current block of video data is coded using affine prediction;
    derive a plurality of candidates of a candidate list for the current block, comprising:
       upon determining one or more inherited candidates are available, determining the one or more inherited candidates that each inherit an affine model of an associated neighboring block; and
       upon determining one or more constructed candidates are available, deriving the one or more constructed candidates that are each based on a plurality of associated neighboring blocks of the current block;
    upon determining the candidate list is not full, filling the candidate list by deriving other candidates of the candidate list, comprising:
       upon determining one or more additional derived candidates are available, deriving the one or more additional derived candidates based on the plurality of associated neighboring blocks of the current block, and adding the derived one or more additional derived candidates into the candidate list; and
       upon determining the candidate list is not full and one or more temporal motion vector candidates is available, deriving the one or more temporal motion vector candidates based on a temporal collocated picture, and adding the derived one or more temporal motion vector candidates into the candidate list; and
    upon determining the candidate list is not full after filling the candidate list by deriving the other candidates, filling the candidate list by deriving additional candidates needed to fill the candidate list, comprising deriving one or more zero motion vector candidates.

15. The apparatus of claim 14, wherein deriving the one or more additional derived candidates that are based on the plurality of associated neighboring blocks of the current block comprises:
    determining a first available motion vector based on a first set of neighboring blocks; and
    deriving a first candidate comprising the first available motion vector for each control point of the first candidate.

16. The apparatus of claim 14, wherein deriving the one or more temporal motion vector candidate comprises:
    determining a motion vector is available from a block of the temporal collocated picture that is adjacent to a bottom-right sub-block of a temporal collocated block to the current block in the temporal collocated picture; and
    deriving one of the one or more temporal motion vector candidates comprising the motion vector for each control point of the one temporal motion vector candidate.

17. The apparatus of claim 14, further comprising:
    determining a motion vector is not available from a block of the temporal collocated picture that is adjacent to a bottom-right sub-block of a temporal collocated block to the current block in the temporal collocated picture; and
    deriving one of the one or more temporal motion vector candidates comprising a motion vector from a center bottom-right sub-block of the temporal collocated block for each control point of the one temporal motion vector candidate.

18. At least one non-transitory computer-readable storage medium storing processor-executable instructions that, when executed by at least one computer hardware processor, cause the at least one computer hardware processor to perform the acts of:
    determining a current block of video data is coded using affine prediction;
    deriving a plurality of candidates of a candidate list for the current block, comprising:
       upon determining one or more inherited candidates are available, determining the one or more inherited candidates that each inherit an affine model of an associated neighboring block; and
       upon determining one or more constructed candidates are available, deriving the one or more constructed candidates that are each based on a plurality of associated neighboring blocks of the current block;
    upon determining the candidate list is not full, filling the candidate list by deriving other candidates of the candidate list, comprising:
       upon determining one or more additional derived candidates are available, deriving the one or more additional derived candidates based on the plurality of associated neighboring blocks of the current block, and adding the derived one or more additional derived candidates into the candidate list; and upon determining the candidate list is not full and one or more temporal motion vector candidates is available, deriving the one or more temporal motion vector candidates based on a temporal collocated picture, and adding the derived one or more temporal motion vector candidates into the candidate list; and upon determining the candidate list is not full after filling the candidate list by deriving the other candidates, filling the candidate list by deriving additional candidates needed to fill the candidate list, comprising deriving one or more zero motion vector candidates.

\* \* \* \* \*